(12) United States Patent
Higuchi

(10) Patent No.: US 10,507,400 B2
(45) Date of Patent: Dec. 17, 2019

(54) ROBOT

(71) Applicant: Panasonic Intellectual Property Management Co., Ltd., Osaka (JP)

(72) Inventor: Seiya Higuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/019,450

(22) Filed: Jun. 26, 2018

(65) Prior Publication Data
US 2019/0015758 A1    Jan. 17, 2019

(30) Foreign Application Priority Data

Jul. 14, 2017    (JP) .................. 2017-138271

(51) Int. Cl.
| | |
|---|---|
| *G05G 11/00* | (2006.01) |
| *A63H 33/00* | (2006.01) |
| *B62D 57/02* | (2006.01) |
| *G05D 1/08* | (2006.01) |
| *B25J 11/00* | (2006.01) |
| *B25J 5/00* | (2006.01) |
| *B25J 9/16* | (2006.01) |
| *B25J 13/08* | (2006.01) |
| *G06N 3/00* | (2006.01) |

(52) U.S. Cl.
CPC ........ *A63H 33/005* (2013.01); *B25J 11/0005* (2013.01); *B62D 57/02* (2013.01); *G05D 1/0891* (2013.01); *A63H 2200/00* (2013.01); *B25J 5/00* (2013.01); *B25J 9/1664* (2013.01); *B25J 13/085* (2013.01); *B25J 13/088* (2013.01); *G05D 2201/0214* (2013.01); *G06N 3/008* (2013.01)

(58) Field of Classification Search
CPC ......... A63H 33/005; G05D 2201/0214; G05D 1/0088; B25J 5/00; B25J 11/0015
See application file for complete search history.

(56) References Cited

U.S. PATENT DOCUMENTS

| | | | | |
|---|---|---|---|---|
| 2,942,379 | A | * 6/1960 | Oman .................. | A63H 33/005 446/149 |
| 4,726,800 | A | * 2/1988 | Kobayashi ........... | A63H 33/005 446/458 |
| 2005/0228540 | A1 | 10/2005 | Moridaira | |

FOREIGN PATENT DOCUMENTS

| | | |
|---|---|---|
| JP | 2004-306251 | 11/2004 |
| JP | 2014-184527 | 10/2014 |

* cited by examiner

*Primary Examiner* — Jake Cook
(74) *Attorney, Agent, or Firm* — Greenblum & Bernstein, P.L.C.

(57) ABSTRACT

A robot includes a control circuit that detects a changing maximum value of a pitch angle, when the robot moves to a predetermined target point by rotating its main body. The control circuit determines a minimum control amount corresponding to the maximum value of the pitch angle, when the robot arrives at a predetermined distance short of the predetermined target point. The control circuit generates a deceleration control amount for the second drive mechanism that is greater than or equal to the minimum control amount, according to a remaining distance to the predetermined target point. The control circuit decelerates the rotation of the main body by controlling the second drive mechanism in accordance with the deceleration control amount.

6 Claims, 17 Drawing Sheets

T15

| MAXIMUM PITCH ANGLE [deg] | MINIMUM CONTROL AMOUNT [Hz] |
|---|---|
| 0 ≤ deg < 5 | 100 |
| 5 ≤ deg < 10 | 150 |
| 10 ≤ deg < 15 | 200 |
| 15 ≤ deg < 20 | 250 |
| 20 ≤ deg < 25 | 300 |
| 25 ≤ deg < 30 | 350 |
| 30 ≤ deg | 400 |

ROBOT

BACKGROUND

1. Technical Field

The present disclosure relates to a robot.

2. Description of the Related Art

Japanese Unexamined Patent Application Publication No. 2004-306251 discloses a robot that determines whether or not the robot is in a state of being held or a state of being lifted by a user's arms, and stops the operation of joint mechanisms based on a determination result.

SUMMARY

However, further improvement on the above-mentioned technique in related art is called for.

In one general aspect, the techniques disclosed here feature a robot including: a main body in a spherical-zone shape obtained by cutting a first side and a second side opposed to the first side off from a sphere; a first spherical crown corresponding to the first side; a second spherical crown corresponding to the second side; a shaft that connects the first spherical-crown and the second spherical-crown; a display that is mounted in the shaft via an arm and displays at least part of a face of the robot; a first drive mechanism that rotates the first spherical-crown and the second spherical-crown by rotation of the shaft; a second drive mechanism that is independent of the first drive mechanism and rotates the main body around the shaft as a center; an angular speed sensor that detects an angular speed, of the display, around an axis in a horizontal direction perpendicular to a moving direction of the main body; a memory that stores a correspondence relationship between a reference pitch angle and a minimum control amount which is used in the second drive mechanism for moving the main body without being stopped; and a control circuit that, when the robot moves to a predetermined target point by rotating the main body, detects a maximum value of a pitch angle which changes since an instruction to rotate the main body is given to the second drive mechanism, where the pitch angle is a cumulative value of the detected angular speed, determines a minimum control amount corresponding to the detected maximum value of the pitch angle by referring to the correspondence relationship, when the robot arrives at a location a predetermined distance short of the predetermined target point, generates a deceleration control amount for the second drive mechanism in a range greater than or equal to the minimum control amount, according to a remaining distance to the predetermined target point, and decelerates the rotation of the main body by controlling the second drive mechanism in accordance with the deceleration control amount.

These general and specific aspects may be implemented using a system, a method, and a computer program, and any combination of systems, methods, and computer programs.

Thus, for instance, when a user calls a robot to move toward the user, the robot can stop at the location of the user.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1A:
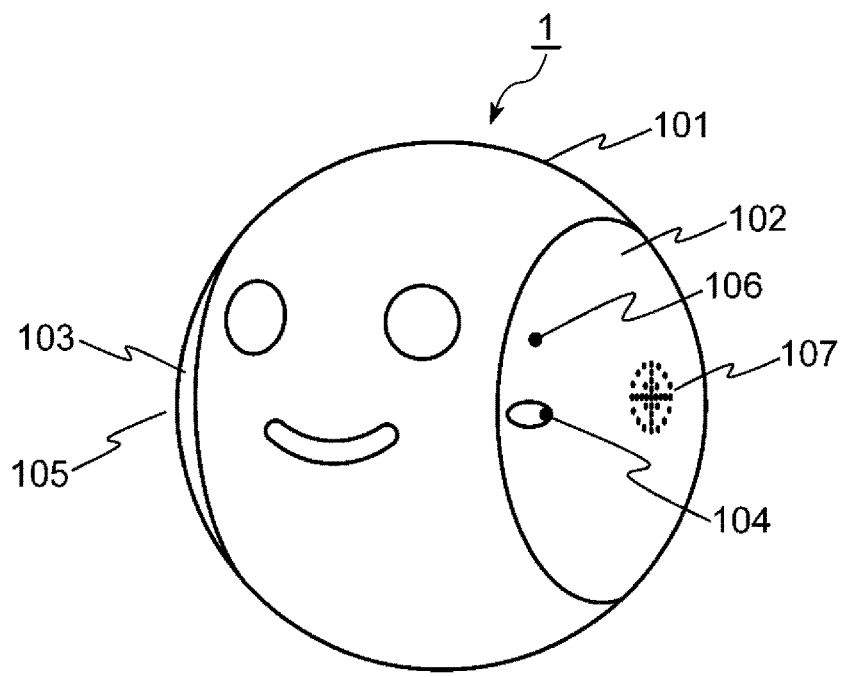
FIG. 1A is an external appearance perspective view of a robot according to an embodiment of the present disclosure.

DETAILED DESCRIPTION (Underlying Knowledge Forming Basis of Aspect of the Present Disclosure)

First, the inventor has been studying a robot that has a spherical body and moves by rotating the body.

The inventor has been studying the function that allows a user of the above-mentioned robot to move the robot to the location of the user by calling the name of the robot.

In order to achieve such function of the robot, the inventor has devised the following specifications.

Specifically, the robot recognizes an instruction for moving the robot to the location of the user and identifies the location of the user based on the voice uttered by the user. The robot then sets the identified location of the user as a target point, and starts to move to the target point. When detecting arrival to the target point, the robot stops the movement motion.

However, after the inventor tried various experiments, it was found that stopping the robot at the target point is not necessarily easy. This is because the body of the robot is spherical and is likely to be rolled, and thus stopping the robot at a desired location is not easy. As a consequence, the robot sometimes stopped short of the location of the user or passed by the location of the user due to inertia even after driving of the robot was stopped.

Therefore, in order to avoid stopping of the robot short of the location of the user or stopping of the robot after passing the location of the user, the performance of the robot had to be improved so that the robot stops at the location of the user.

After intensive study, the inventor has found that in order to stop the robot at the location of the user, not only information indicating the speed of movement of the robot and information indicating the distance to the target point, but also information indicating the material of a moving surface are needed.

Meanwhile, the robot itself can identify the information indicating the speed of movement of the robot, for instance, from information indicating the number of revolutions of a motor inside the robot. Similarly, the robot itself can identify the information indicating the distance to the target point based on, for instance, information inputted from a camera built in the robot.

As for the information indicating the material of a moving surface, the inventor found a problem that such information is not directly identifiable from the information inputted from sensors provided inside the robot.

As a result of intensive study, the inventor focused on the fact that when the robot starts to move, a rotation angle of the main body of the robot varies according to the material of a moving surface. For instance, when a moving surface is wood floor, the friction between the robot and the moving surface is relatively low. Thus, in this case, the angle of rotation of the main body of the robot is relatively small. In contrast, when the moving surface is carpet, the friction between the robot and the moving surface is relatively high. Thus, in this case, the angle of rotation of the main body of the robot is relatively large. Consequently, although the information indicating the material of a moving surface is not directly identifiable from the information inputted from sensors provided inside the robot, the information is identifiable based on the rotation angle of the main body of the robot when the robot starts to move.

Based on the knowledge described above, the inventor has devised an aspect of the invention below.

A robot according to an aspect of the present disclosure includes: a main body in a spherical-zone shape obtained by cutting a first side and a second side opposed to the first side off from a sphere; a first spherical crown corresponding to the first side; a second spherical crown corresponding to the second side; a shaft that connects the first spherical-crown and the second spherical-crown; a display that is mounted in the shaft via an arm and displays at least part of a face of the robot; a first drive mechanism that rotates the first spherical-crown and the second spherical-crown by rotation of the shaft; a second drive mechanism that is independent of the first drive mechanism and rotates the main body around the shaft as a center; an angular speed sensor that detects an angular speed of the display, around an axis in a horizontal direction perpendicular to a moving direction of the main body; a memory that stores a correspondence relationship between a reference pitch angle and a minimum control amount which is used in the second drive mechanism for moving the main body without being stopped; and a control circuit that, when the robot moves to a predetermined target point by rotating the main body, detects a maximum value of a pitch angle which changes since an instruction to rotate the main body is given to the second drive mechanism, where the pitch angle is a cumulative value of the detected angular speed, determines a minimum control amount corresponding to the detected maximum value of the pitch angle by referring to the correspondence relationship, when the robot arrives at a location a predetermined distance short of the predetermined target point, generates a deceleration control amount for the second drive mechanism in a range greater than or equal to the minimum control amount, according to a remaining distance to the predetermined target point, and decelerates the rotation of the main body by controlling the second drive mechanism in accordance with the deceleration control amount.

According to the aspect, there is provided an angular speed sensor that detects an angular speed with respect to the horizontal direction perpendicular to the moving direction of the main body so that when the robot moves to a predetermined target point by rotating the main body, a maximum value of the angular speed is detected, which changes in a predetermined time since an instruction of rotating the main body is given to the second drive mechanism.

Thus, a minimum control amount corresponding to a maximum value of the detected pitch angle is determined, and when the robot arrives at a location a predetermined distance short of the target point, a deceleration control amount for the second drive mechanism is generated according to the remaining distance to the target point in a range greater than or equal to the minimum control amount so that rotation of the main body is decelerated by controlling the second drive mechanism in accordance with the deceleration control amount.

Thus, the robot can stop at the location of the user in consideration of the material of a moving surface based on the rotation angle of the main body of the robot at the start of movement of the robot without stopping short of the location of the user or stopping after passing the location of the user.

In other words, the robot decelerates in a range greater than or equal to the minimum control amount in accordance with the deceleration control amount, and thus it is possible to prevent stopping of the robot short of the location of the user. Also, the robot decelerates near the predetermined target point in accordance with a deceleration control amount in the vicinity of the minimum control amount, and thus it is possible to avoid rolling of the robot due to inertia after an instruction of stopping rotation of the main body is given. Therefore, when an instruction of stopping the rotation of the main body is given, the robot can be stopped at the timing.

In the aspect, the control circuit may decelerate the rotation of the main body by decreasing the deceleration control amount by S-curve control.

In the aspect, the rotation of the main body is decelerated by S-curve control, and thus the robot can be stopped without wobbling at a predetermined target point.

In the aspect, when movement of the robot is started by rotating the main body, the control circuit may accelerate the rotation of the main body by increasing an acceleration control amount for accelerating the rotation of the main body by trapezoidal control until a rotational speed of the main body reaches a predetermined speed.

In the aspect, when the robot is started to move, the main body is accelerated by trapezoidal control until the rotational speed of the main body reaches a predetermined speed, and thus it is possible to shorten the movement time of the robot to a predetermined target point.

In the aspect, after the rotational speed of the main body reaches the predetermined speed, the control circuit may maintain the rotational speed of the main body at the predetermined speed until the robot arrives at the location the predetermined distance short of the predetermined target point.

In the aspect, after the rotational speed of the main body reaches a predetermined speed, the rotational speed of the main body is maintained at the predetermined speed until the robot arrives at a location a predetermined distance short of a predetermined target point, and thus it is possible to prevent the rotational speed of the main body from exceeding the predetermined speed. Therefore, the rotational speed of the main body can be prevented from increasing excessively.

In the aspect, the robot may further include: a camera included in at least one of the first spherical-crown and the second spherical-crown; and a microphone included in at least one of the first spherical-crown and the second spherical-crown. The memory may store reference data image for checking a person and reference voice data for recognizing voice, and the control circuit, when determining that a predetermined person has uttered predetermined words based on voice data inputted from the microphone and the reference voice data and recognizing the predetermined person based on image data inputted from the camera and the reference data image, may set a location of the predetermined person as the predetermined target point.

In the aspect, it is determined that a predetermined person utters predetermined words based on voice data and reference voice data inputted from a microphone, and when a predetermined person is recognized based on image data and reference data image inputted from a camera, the location of the predetermined person is set as a predetermined target point. Thus, in the aspect, for instance, even when multiple persons are present around the robot, the robot can be stopped at the location of a person who has uttered the predetermined words.

In the aspect, the control circuit generates the deceleration control amount using a calculation expression below: $(\text{SIN}(3*\pi/2-\pi/L*d)+1)*(\text{Max}-\text{min})/2+\text{min}$, where in the calculation expression, d indicates a distance (m) from a location of the robot to the predetermined target point, Max indicates a control amount (Hz) when the control circuit starts to control the second drive mechanism in accordance with the deceleration control amount, min indicates the minimum control amount, and L indicates a predetermined distance from the target point.

In the aspect, the deceleration control amount is generated using the calculation expression, thus the robot can be moved to a predetermined target point without wobbling by S-curve control, and the robot can be stopped at the predetermined target point accurately.

Embodiment

Hereinafter, embodiments of the present disclosure will be described with reference to the drawings. It is to be noted that the same symbol is used for the same components in the drawings.

(Entire Configuration)

Figure 1B:
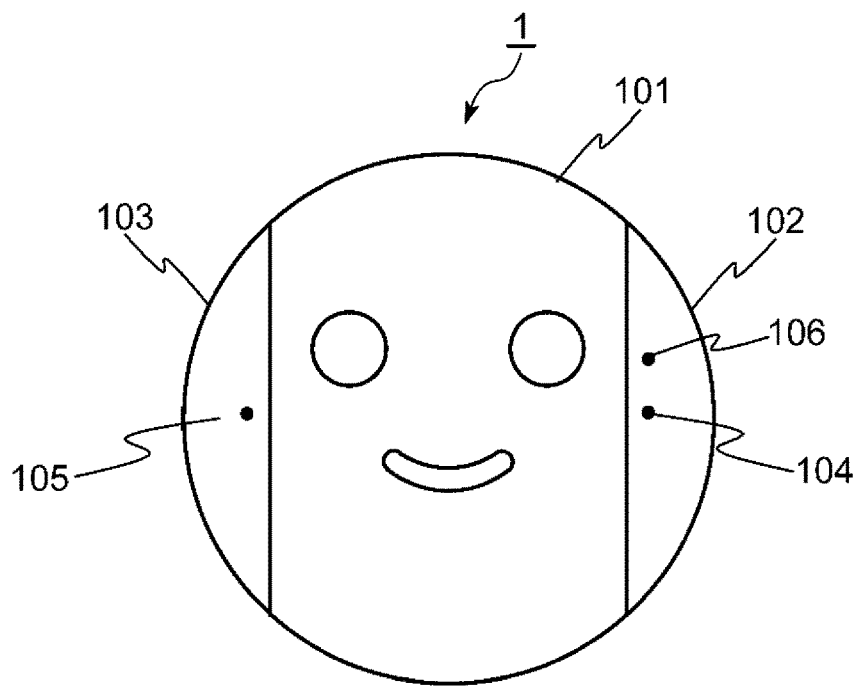
FIG. 1B is an external appearance front view of the robot according to the embodiment of the present disclosure.

FIG. 1A is an external appearance perspective view of a robot 1 according to an embodiment of the present disclosure. FIG. 1B is an external appearance front view of the robot 1 according to the embodiment of the present disclosure. As illustrated in FIGS. 1A and 1B, the robot 1 includes a spherical-zone shaped main body 101, a first spherical crown 102, and a second spherical crown 103. The main body 101, the first spherical crown 102, and the second spherical crown 103 constitute a sphere in its entirety. In short, the robot 1 has a spherical shape. Also, as illustrated in FIG. 1A, the robot 1 includes a camera 104 in the first spherical crown 102 and a distance sensor 105 in the second spherical crown 103. The camera 104 is provided in the first spherical crown 102 so that the optical axis of the camera 104 faces, for instance, the front of the robot 1, and the camera 104 obtains an image of the surrounding environment of the robot 1. In addition, the distance sensor 105 is mounted in the second spherical crown 103 so that the optical axis of the distance sensor 105 faces, for instance, the front of the robot 1, and the distance sensor 105 obtains information on distance to objects located in the surrounding environment of the robot 1.

As illustrated in FIG. 1A, the robot 1 includes a microphone 106 and a loudspeaker 107 in the first spherical crown 102. The microphone 106 obtains voice in the surrounding environment of the robot 1. Also, the loudspeaker 107 outputs voice information of the robot 1. Although the robot 1 includes the camera 104 in the first spherical crown 102 and the distance sensor 105 in the second spherical crown 103 in the aspect, without being limited to this, it is sufficient that the camera 104 and the distance sensor 105 be included in at least one of the first spherical crown 102 and the second spherical crown 103. Although the robot 1 includes the microphone 106 and the loudspeaker 107 in the first spherical crown in the aspect, without being limited to this, it is sufficient that the microphone 106 and the loudspeaker 107 be included in at least one of the first spherical crown 102 and the second spherical crown 103.

Figure 2:
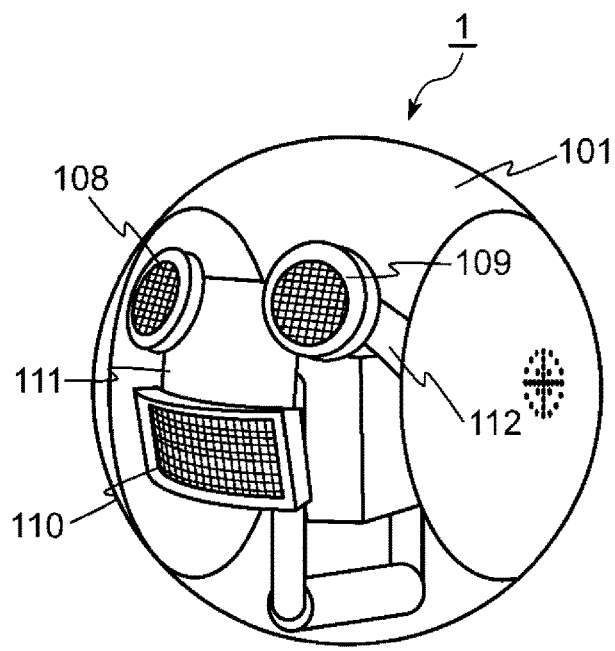
FIG. 2 is an internal perspective view of the robot according to the embodiment of the present disclosure.
Figure 3:
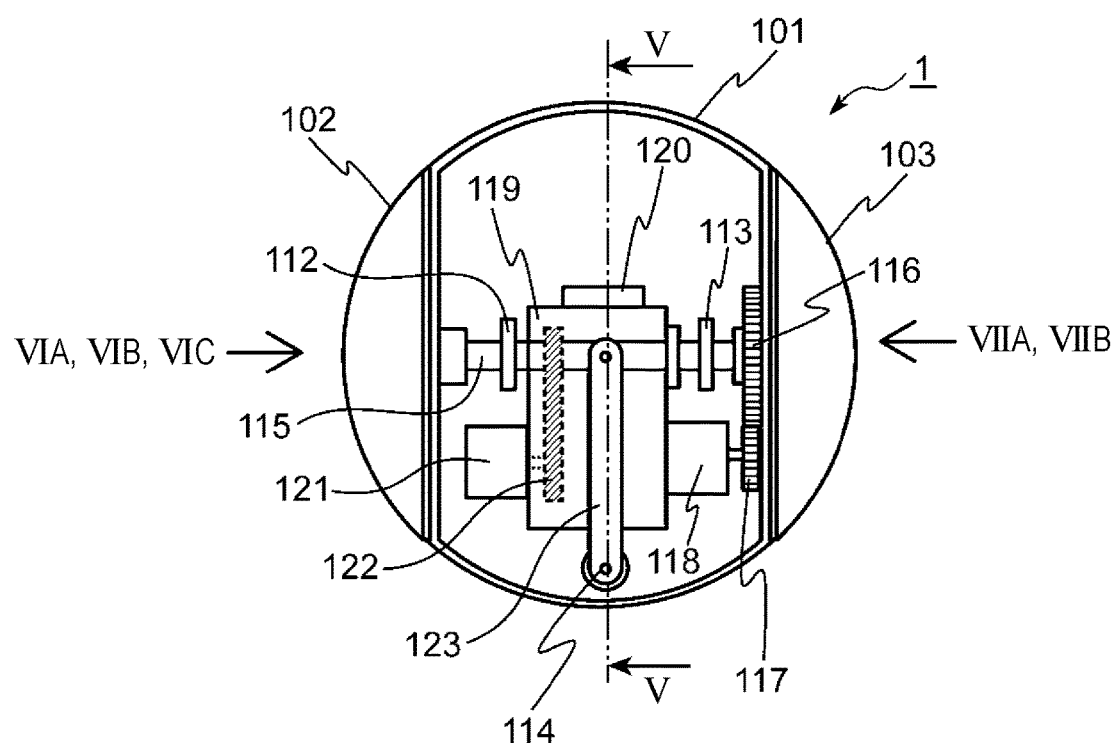
FIG. 3 is an internal back view of the robot according to the embodiment of the present disclosure.

FIG. 2 is an internal perspective view of the robot 1 according to the embodiment of the present disclosure. As illustrated in FIG. 2, the robot 1 includes a first display 108, a second display 109, and a third display 110 inside the main body 101. The first display 108, the second display 109, and the third display 110 are provided in a fixed metal sheet 111. Also, the fixed metal sheet 111 is mounted on a shaft 115 (FIG. 3) via a first arm 112 and a second arm 113 (FIG. 3). FIG. 3 is an internal back view of the robot 1 according to the embodiment of the present disclosure. As illustrated in FIG. 3, the first arm 112 and the second arm 113 are mounts on the shaft 115 so as to extend from the shaft 115 in a perpendicular direction to the shaft 115. The first display 108, the second display 109, and the third display 110 are comprised of, for instance, multiple light emitting diodes. The first display 108, the second display 109, and the third display 110 display information for display on the facial expression of the robot 1. Specifically, as illustrated in FIGS. 1A and 1B, the first display 108, the second display 109, and the third display 110 display part of the face of the robot 1, for instance, the eyes and mouth by individually controlling the lighting of the multiple light emitting diodes. In the example of FIG. 2, the first display 108 displays an image of the left eye as seen from the front of the robot 1, the second display 109 displays an image of the right eye as seen from the front of the robot 1, and the third display 110 displays an image of the mouth. The images of the left eye, the right eye, and the mouth are projected to the outside through the main body 101 composed of a transparent or semi-transparent member.

As illustrated in FIG. 3, the robot 1 includes a weight 114 at a lower portion inside the main body 101. For this reason, the center of gravity of the robot 1 is located below the center of the main body 101. Thus, the operation of the robot 1 can be stabilized. FIG. 3 is a view illustrating a shaft drive mechanism 206 (FIG. 11) that rotates the shaft 115, a body drive mechanism 208 (FIG. 11) that rotates the main body 101, and a weight drive mechanism 210 (FIG. 11) that moves the center of gravity of the robot 1.

Figure 4:
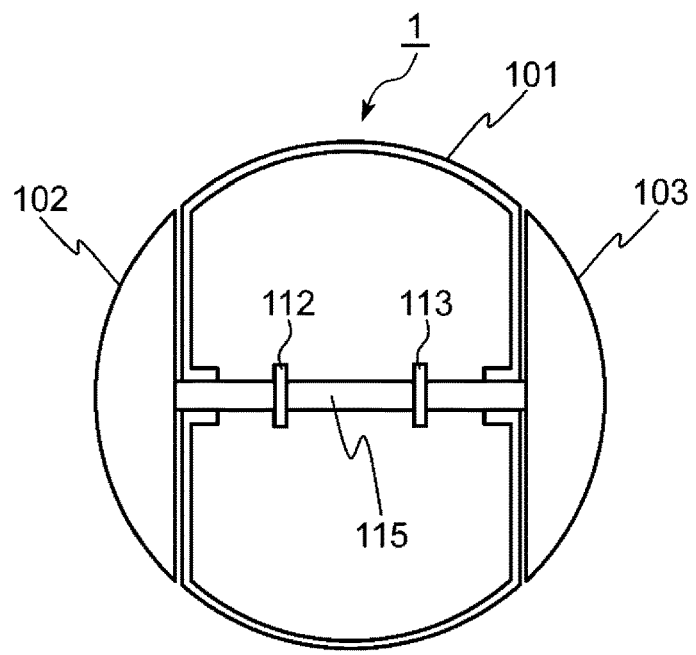
FIG. 4 is an internal back view of a first spherical crown and a second spherical crown of the robot according to the embodiment of the present disclosure.

In FIG. 3, the shaft 115 is located at the center of the robot 1, and serves as the central shaft of the robot 1. FIG. 4 is an internal back view illustrating a connected state of the first spherical crown 102 and the second spherical crown 103 of the robot according to the embodiment of the present disclosure. In FIG. 4, the first spherical crown 102 and the second spherical crown 103 are connected by the shaft 115. In contrast, the shaft 115 and the main body 101 are not fixed to each other. Therefore, when the shaft 115 is rotated, the first spherical crown 102 and the second spherical crown 103 connected to the shaft 115 are rotated in synchronization with the shaft 115, but the main body 101 is not rotated.

In FIG. 3, the body drive mechanism 208 (FIG. 11) includes a first gear 116 fixed to the main body 101, a second gear 117 engaged with the first gear 116, a first motor 118 connected to the second gear 117, and a frame 119 that fixes the first motor 118. The frame 119 is not rotated even when shaft 115 is rotated because the frame 119 is suspended by the shaft 115. Also the frame 119 includes an angular speed sensor 120 that detects a rotational amount of the frame 119. It is to be noted that in the aspect, the center of the first gear 116 matches the center of the shaft 115. The details of the operation of the body drive mechanism 208 (FIG. 11) will be described later.

Figure 5:
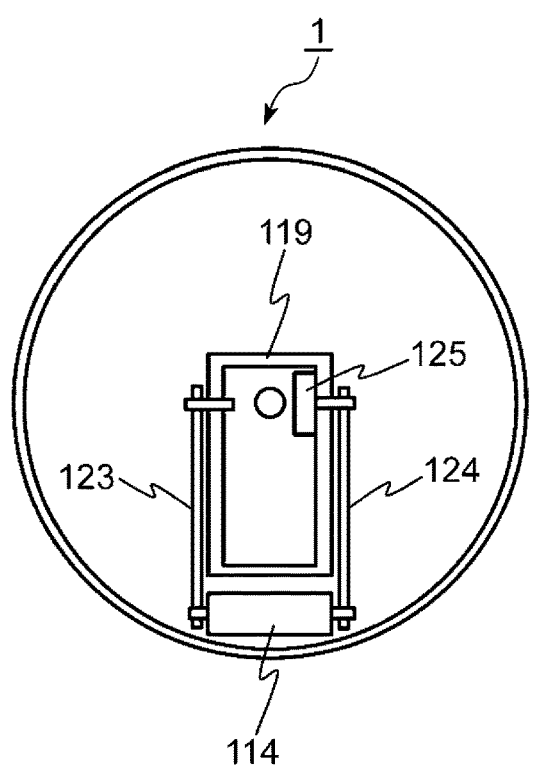
FIG. 5 is a V-V cross-sectional view of the robot in FIG. 3.

Next, the weight drive mechanism 210 (FIG. 11) will be described with reference to FIGS. 3 and 5. FIG. 5 is a V-V cross-sectional view of the robot in FIG. 3. It is to be noted that the V-V cross-section is a cross-section when the robot 1 is cut by a plane which is perpendicular to VIA direction (or VIIA direction) and passes through the center of the robot 1.

As illustrated in FIGS. 3 and 5, the weight drive mechanism 210 (FIG. 11) includes a third arm 123 that supports one end of the weight 114, a fourth arm 124 that supports the other end of the weight 114, and a third motor 125 connected to the fourth arm 124. In the aspect, the weight drive mechanism 210 (FIG. 11) is rotatably mounted in the frame 119. Therefore, even when the third motor 125 is driven, the frame 119 is not rotated in conjunction with the third motor 125. The details of the operation of the weight drive mechanism 210 (FIG. 11) will be described later.

Figure 6A:
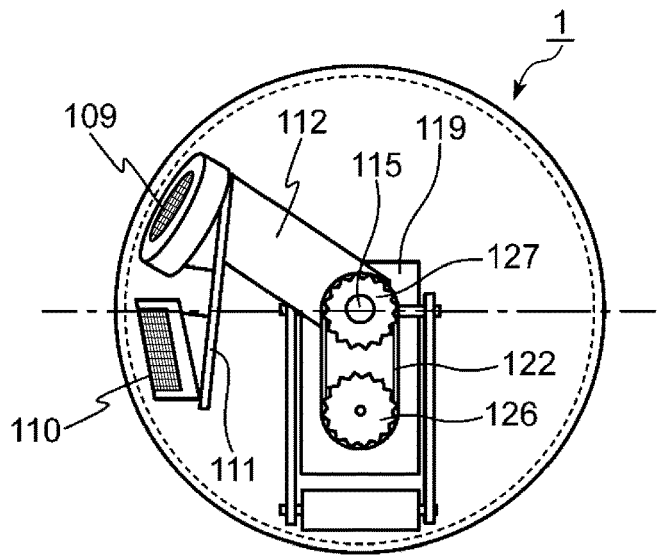
FIG. 6A is an internal side view of the robot in VIA direction of FIG. 3.

Next, the shaft drive mechanism 206 (FIG. 11) will be described with reference to FIGS. 3 and 6A. FIG. 6A is an internal side view of the robot 1 in VIA direction of FIG. 3. VIA direction indicates a viewing direction from the left to the lateral face of the robot 1 as viewed from the back to the front. Also, VIIA direction indicates a viewing direction from the right to the lateral face of the robot 1 as viewed from the back to the front. As illustrated in FIGS. 3 and 6A, the shaft drive mechanism 206 (FIG. 11) includes a second motor 121 fixed to the frame 119, a third gear 126 connected to the second motor 121, and a drive belt 122 that synchronizes the third gear 126 and a fourth gear 127 fixed to the shaft 115. The details of the operation of the shaft drive mechanism (FIG. 11) will be described later.

Figure 11:
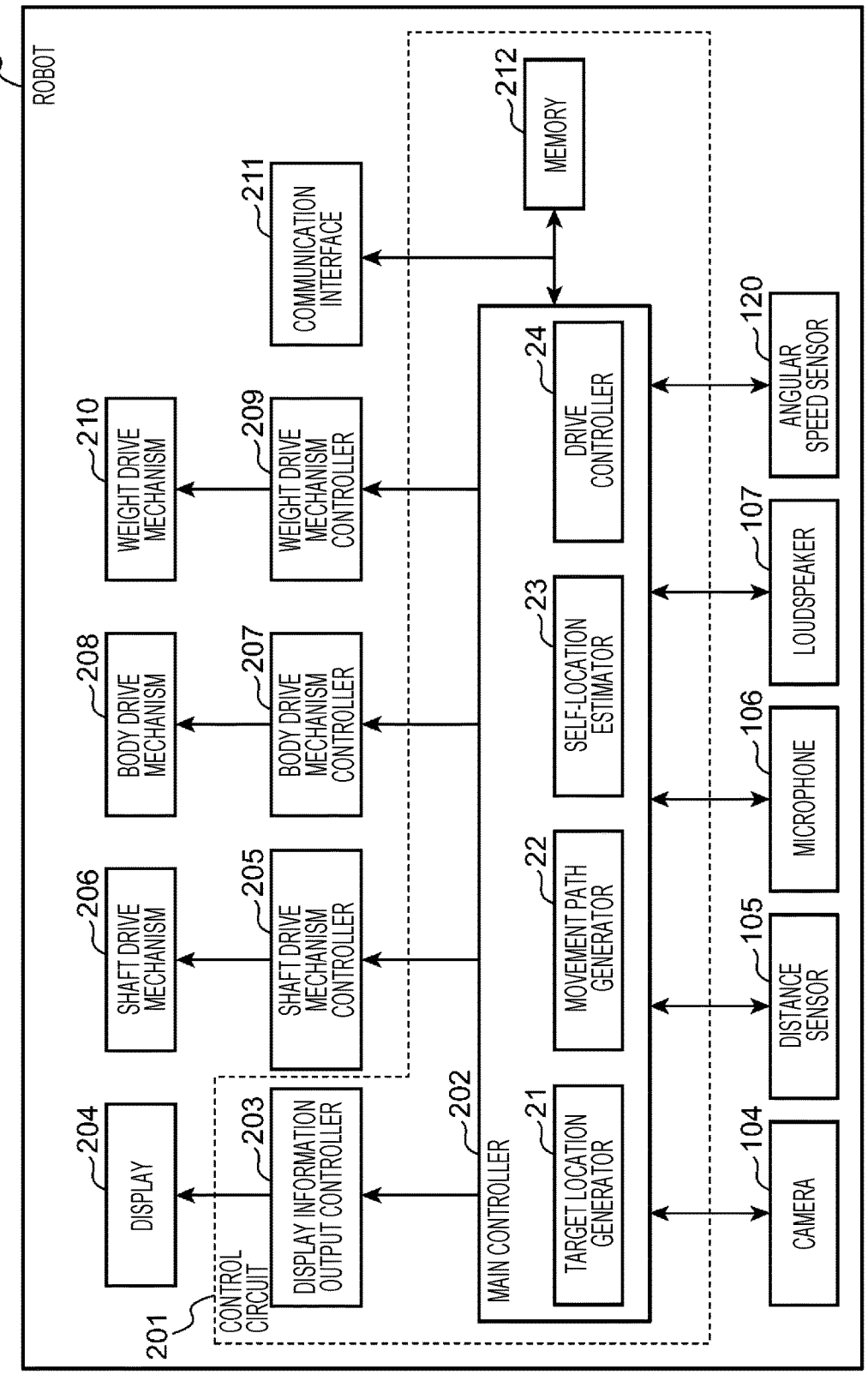
FIG. 11 is a block diagram illustrating the robot according to the embodiment of the present disclosure.

Although the robot 1 is not illustrated in FIG. 3, the robot 1 includes a control circuit 201 (FIG. 11). The control circuit 201 controls various operations of the robot 1. The details of the control circuit 201 (FIG. 11) will be described later.

Next, the details of the operation of the shaft drive mechanism (FIG. 11) will be described with reference to FIGS. 6A, 6B, and 6C.

Figure 6B:
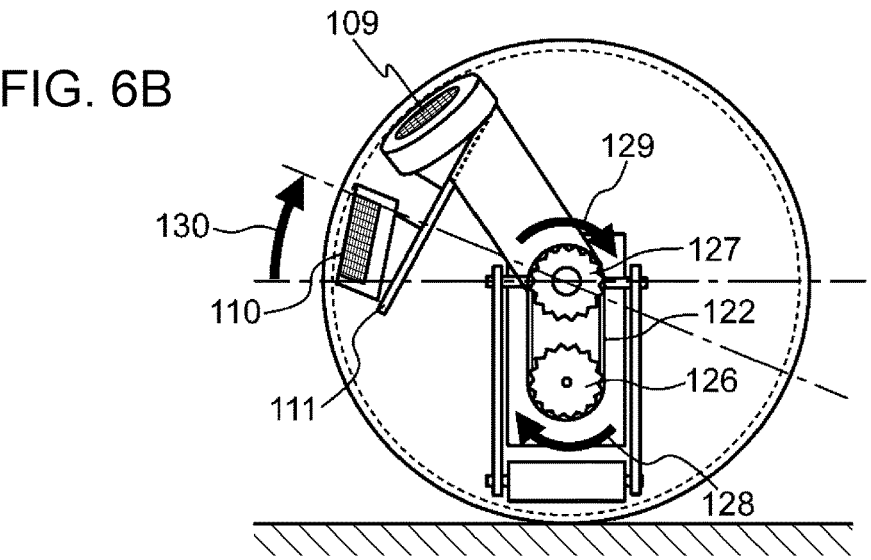
FIG. 6B is an internal side view, in VIB direction of FIG. 3, illustrating a state where a first display, a second display, and a third display of the robot are inclined rearwardly.

FIG. 6B is an internal side view, in VIB direction of FIG. 3, illustrating a state where the first display 108, the second display 109, and the third display 110 of the robot 1 according to the embodiment of the present disclosure are inclined rearwardly. FIG. 6C is an internal side view, in VIC direction of FIG. 3, illustrating a state where the first display 108, the second display 109, and the third display 110 of the robot 1 according to the embodiment of the present disclosure are inclined forwardly.

As illustrated in FIG. 6A, the first display 108, the second display 109, and the third display 110 faces the front of the robot 1 at the default position. When the second motor 121 (FIG. 3) is driven, the third gear 126 connected to the second motor 121 rotates. The power is transmitted to the fourth gear 127 via the drive belt 122, and the shaft 115, to which the fourth gear 127 is fixed, rotates in synchronization with the driving of the second motor 121. Here, as illustrated in FIG. 2, the fixed metal sheet 111 is connected to the shaft 115 via the first arm 112 and the second arm 113. The first spherical crown 102 and the second spherical crown 103 are connected by the shaft 115 (FIG. 4). Thus, the first display 108, the second display 109, and the third display 110 provided in the fixed metal sheet 111 are also rotated in conjunction with the shaft 115 by the rotation of the shaft 115, that is, the rotation of the first spherical crown 102 and the second spherical crown.

As illustrated in FIG. 6B, when the shaft 115 is rotated from the above-mentioned default position in the direction (the clockwise direction around the shaft 115 as viewed in VIA direction (FIG. 3)) indicated by an arrow 128 and an arrow 129, the first display 108, the second display 109 (FIG. 2), and the third display 110 are inclined rearwardly indicated by an arrow 130 (in the clockwise direction around the shaft 115 as viewed in VIA direction (FIG. 3)). Although not illustrated to FIG. 6B, the first spherical crown 102 (FIG. 1B) and the second spherical crown 103 (FIG. 1B) which rotate in synchronization with the shaft 115 are similarly inclined rearwardly indicated by the arrow 130. Thus, information obtained by the camera 104 and the distance sensor 105 provided in the first spherical crown 102 (FIG. 1B) and the second spherical crown 103 (FIG. 1B) is also inclined rearwardly indicated by the arrow 130.

Figure 6C:
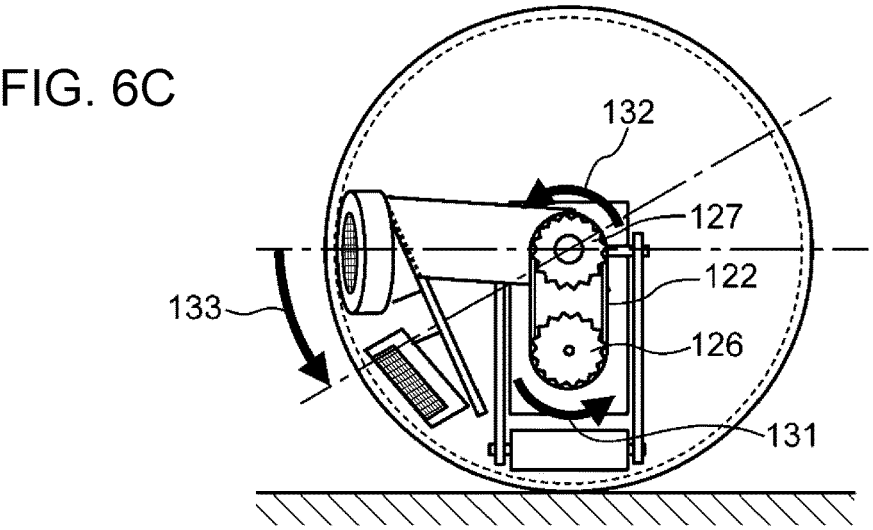
FIG. 6C is an internal side view, in VIC direction of FIG. 3, illustrating a state where a first display, a second display, and a third display of the robot are inclined forwardly.

As illustrated in FIG. 6C, when the shaft 115 is rotated from the above-mentioned default position in the counterclockwise direction around the third gear 126 indicated by an arrow 131 and in the counterclockwise direction around the fourth gear 127 indicated by an arrow 132, the first display 108, the second display 109 (FIG. 2), and the third display 110 are inclined forwardly as indicated by an arrow 133 (in the counterclockwise direction around the shaft 115 as viewed in VIA direction (FIG. 3)). Although not illustrated to FIG. 6C, the first spherical crown 102 (FIG. 1B) and the second spherical crown 103 (FIG. 1B) which rotate in synchronization with the shaft 115 are similarly inclined forwardly indicated by the arrow 132. Thus, information obtained by the camera 104 and the distance sensor 105 provided in the first spherical crown 102 (FIG. 1B) and the second spherical crown 103 (FIG. 1B) is also inclined forwardly indicated by the arrow 132.

Next, the details of the operation of the body drive mechanism 208 (FIG. 11) will be described with reference to FIGS. 7A and 7B.

Figure 7A:
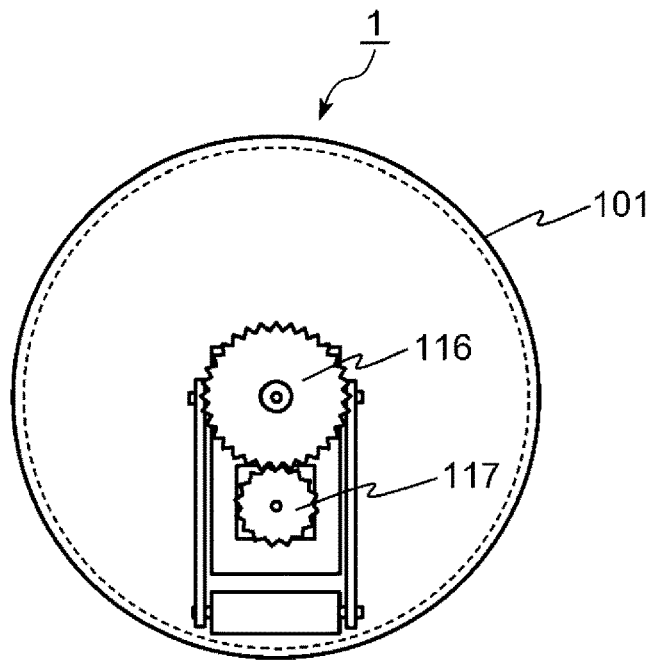
FIG. 7A is a side view, in VIIA direction of FIG. 3, illustrating a body drive mechanism of the robot.

FIG. 7A is a side view, in VIIA direction of FIG. 3, illustrating the body drive mechanism 208 (FIG. 11) of the robot 1 according to the embodiment of the present disclosure. FIG. 7B is a side view, in VIIB direction of FIG. 3, illustrating a rectilinear motion of the robot 1.

In FIG. 7A, when the first motor 118 (FIG. 3) is driven, the second gear 117 connected to the first motor 118 rotates. The power is then transmitted to the first gear 116 engaged with the second gear 117. Thus, the main body 101, to which the first gear 116 is fixed, rotates in synchronization with the driving of the first motor 118.

Figure 7B:
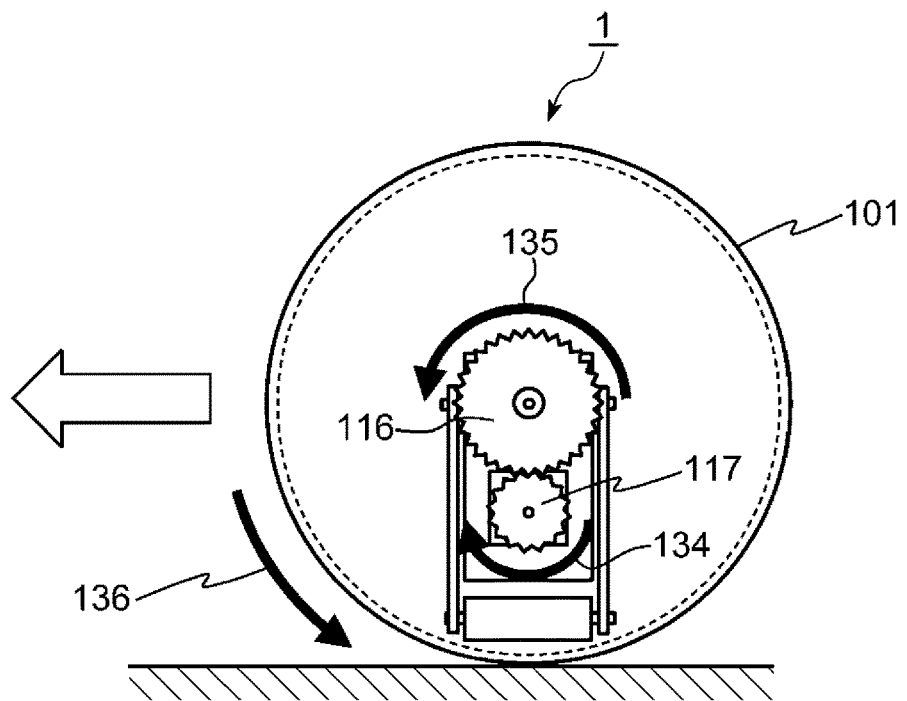
FIG. 7B is a side view, in VIIB direction of FIG. 3, illustrating a rectilinear motion of the robot.

In FIG. 7B, when the first motor 118 (FIG. 3) is rotated in the direction of an arrow 134 (in the clockwise direction around the second gear 117 as viewed in VIA direction (FIG. 3)), the first gear 116 engaged with the second gear 117 is rotated in the direction of an arrow 135 (in the counterclockwise direction around the shaft 115 as viewed in VIA direction (FIG. 3)). The main body 101, to which the first gear 116 is fixed, rotates in the direction of the arrow 136 (in the counterclockwise direction around the shaft 115 as viewed in VIA direction (FIG. 3)). Thus, the robot 1 moves forward. Also, when the first motor 118 is rotated in the opposite direction to the arrow 134, the main body 101 rotates in the opposite direction to the direction of the arrow 136, and thus the robot 1 moves rearward. In this manner, the robot 1 can move in each of the forward and backward directions by switching between the rotation directions of the first motor 118 in the body drive mechanism 208 (FIG. 11).

Next, the details of the operation of the weight drive mechanism 210 (FIG. 11) will be described with reference to FIGS. 8A and 8B.

Figure 8A:
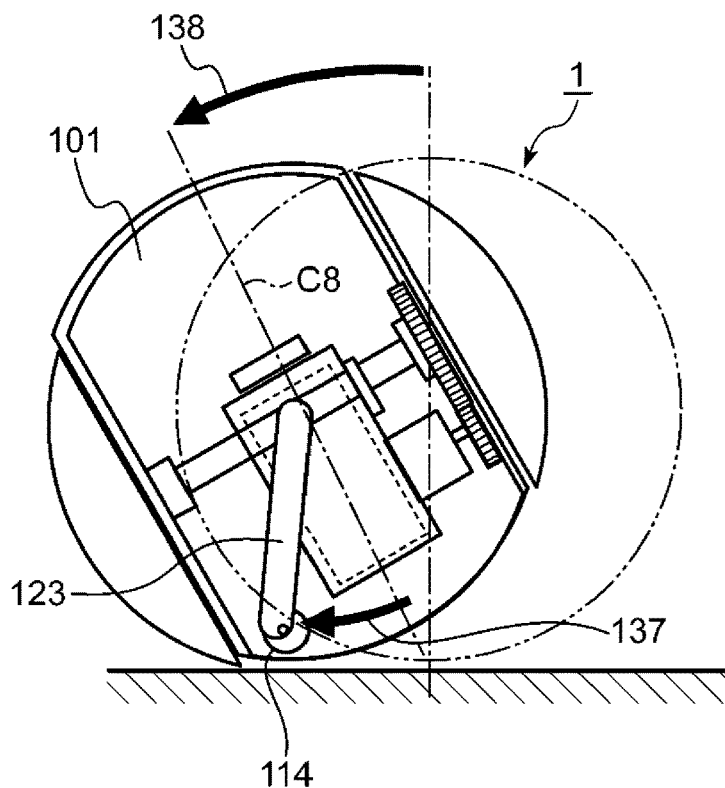
FIG. 8A is an internal back view illustrating a posture of the robot when a weight of the robot is located leftward in FIG. 3.
Figure 8B:
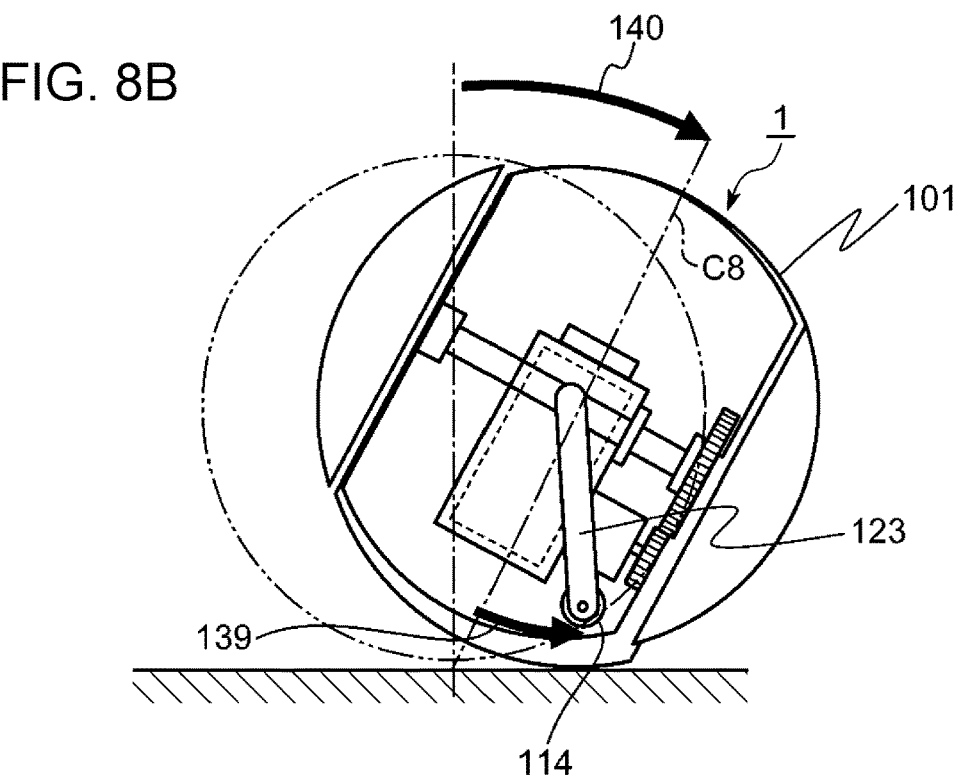
FIG. 8B is an internal back view illustrating a posture of the robot when a weight of the robot is located rightward in FIG. 3.

FIG. 8A is an internal back view illustrating the posture of the robot 1 when the weight 114 of the robot 1 is located leftward in FIG. 3. FIG. 8B is an internal back view illustrating the posture of the robot 1 when the weight 114 of the robot 1 is located rightward in FIG. 3.

As illustrated in FIG. 8A, when the weight 114 is moved leftward indicated by an arrow 137 from a central line C8 (a line passing through an upper vertex and a lower vertex of the main body 101) by driving the third motor 125 (FIG. 5), the posture of the robot 1 is inclined in the direction indicated by an arrow 138 (in the counterclockwise direction with respect to the vertical direction around a point of contact between the ground and the robot 1). Reversely, when the weight 114 is moved rightward (in the counterclockwise direction when the robot 1 is viewed from the back to the front) indicated by an arrow 139 from the central line C8 as illustrated in FIG. 8B by driving the third motor 125 (FIG. 5), the posture of the robot 1 is inclined in the direction indicated by an arrow 140 (in the clockwise direction with respect to the vertical direction around the point of contact between the ground and the robot 1).

Next, a state where the operation of the body drive mechanism 208 (FIG. 11) and the operation of the weight drive mechanism 210 (FIG. 11) are simultaneously driven will be described with reference to FIGS. 8A and 8B.

As illustrated in FIG. 8A, when the posture of the robot 1 is inclined in the direction indicated by the arrow 138 and the first motor 118 is driven so as to move the robot 1 in a traveling direction, the robot 1 performs turning movement leftward in top view. Also, as illustrated in FIG. 8B, when the posture of the robot 1 is inclined in the direction indicated by the arrow 140 and the first motor 118 is driven so as to move the robot 1 in a traveling direction, the robot 1 performs turning movement rightward in top view.

As described above, turning movement of the robot 1 can be performed to set the moving direction of the robot 1 to the right or left by a combination of switching between the right and left directions of the weight 114 by the weight drive mechanism 210 (FIG. 11) and forward or backward operation of the main body 101 performed by the body drive mechanism 208 (FIG. 11).

Next, the posture of the robot 1 at the start of movement will be described with reference to FIG. 9.

Figure 9:
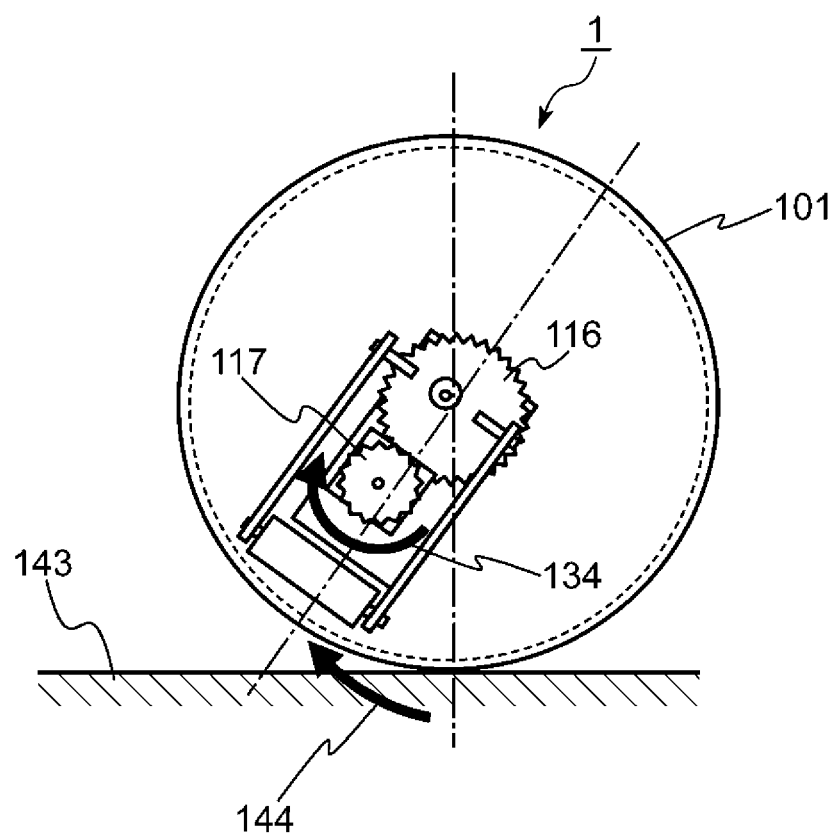
FIG. 9 is a view illustrating a posture of the robot until the main body illustrated in FIG. 7B starts to rotate in a direction of an arrow.

FIG. 9 is a view illustrating the posture of the robot 1 until the main body 101 starts to rotate in the direction indicated by the arrow 136 illustrated in FIG. 7B. When a force generated by driving the body drive mechanism 208 (FIG. 11) is greater than a force due to an external factor such as friction of a floor surface 143, the main body 101 starts to rotate in the direction of the arrow 136 (FIG. 7B). Also, when a force generated by driving the body drive mechanism 208 (FIG. 11) is less than a force due to an external factor such as friction of a floor surface 143, the main body 101 does not start to rotate. In this case, when the main body 101 does not rotate, the first gear 116 does not rotate either because the first gear 116 is fixed to the main body 101. In FIG. 9, when the main body 101 does not rotate and the first motor 118 is rotated in the direction of the arrow 134 (in the clockwise direction around the shaft 115 as viewed in VIA direction (FIG. 3)), the second gear 117 moves along the engaging teeth of the first gear 116. Since the second gear 117 and the first motor 118 are fixed to the frame 119 (FIG. 3), the second gear 117 rotates in the direction of the arrow 144 (in the clockwise direction around the shaft 115 as viewed in VIA direction (FIG. 3)) along with the frame 119 (FIG. 3) and the weight drive mechanism (FIG. 11) and the angular speed sensor 120 (FIG. 3) fixed to the frame 119 (FIG. 3).

Thus, the pitch angle of the main body 101 increases by the effect of a force due to an external factor during a period until the robot 1 starts to move. Also, the angular speed sensor 120 is mounted in the frame 119, and the pitch angle of the frame 119 also increases as the pitch angle of the main body 101 increases. Therefore, the angular speed sensor 120 can detect an angular speed of the main body 101 in the pitch direction. Consequently, the pitch angle of the main body 101 is detected by accumulating the angular speed in the pitch direction detected by the angular speed sensor 120.

Figure 10:
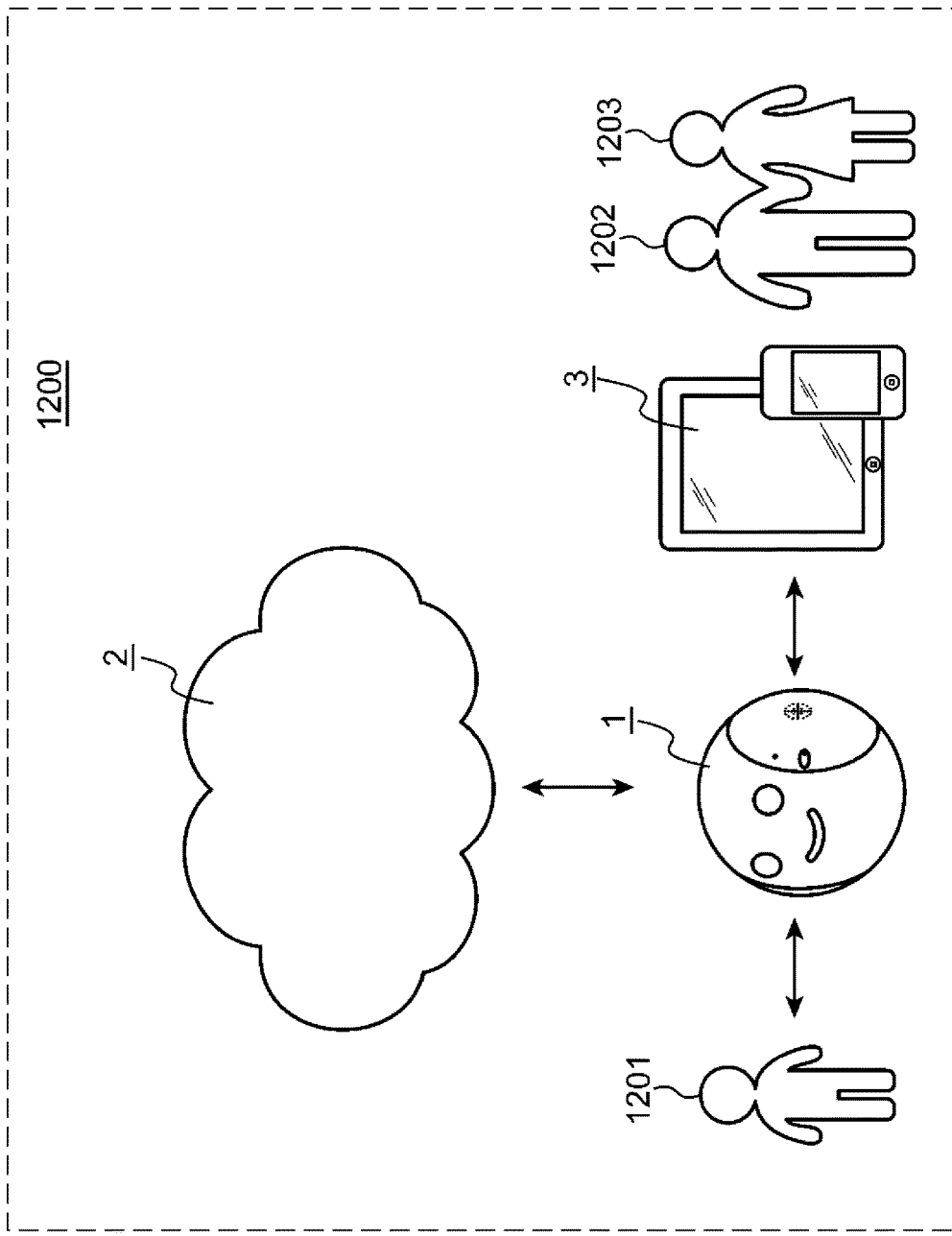
FIG. 10 is an illustration depicting an example of an entire configuration of a robot system which uses the robot according to the embodiment of the present disclosure.

Next, an example of the entire configuration of a robot system 1200 which uses the robot 1 according to the embodiment of the present disclosure will be described with reference to FIG. 10. FIG. 10 is an illustration depicting an example of an entire configuration of a robot system 1200 which uses the robot 1 according to the embodiment of the present disclosure. The robot system 1200 includes a cloud server 2, a mobile terminal 3, and the robot 1. The robot 1 is connected to the Internet, for instance, via communication of Wi-Fi (registered trademark), and is connected to the cloud server 2. Also, the robot 1 is connected to the mobile terminal 3 via communication of Wi-Fi (registered trademark). A user 1201 is, for instance, a child and users 1202 and 1203 are, for instance, the parents of the child.

For instance, when an instruction of reading aloud a picture book for the child is given from the mobile terminal 3, the robot 1 starts to read aloud the picture book for the child. For instance, when receiving a question from the child while reading aloud the picture book, the robot 1 sends the question to the cloud server 2, receives an answer for the question from the cloud server 2, and utters a voice indicating the answer.

Like this, the users 1201 and 1203 can treat the robot 1 like a pet, and the child can learn language through interaction with the robot 1.

Next, the details of the internal circuit of the robot 1 according to the embodiment of the present disclosure will be described with reference to FIG. 11. FIG. 11 is a block diagram illustrating the robot 1 according to the embodiment of the present disclosure.

As illustrated in FIG. 11, the robot 1 includes a control circuit 201, a display 204, a shaft drive mechanism controller 205 (an example of the first drive mechanism), a shaft drive mechanism 206 (an example of the first drive mechanism), a body drive mechanism controller 207 (an example of the second drive mechanism), the body drive mechanism 208 (an example of the second drive mechanism), a weight drive mechanism controller 209, a weight drive mechanism 210, a communication interface 211, the camera 104, the distance sensor 105, the microphone 106, the loudspeaker 107, and the angular speed sensor 120.

The control circuit 201 includes a memory 212, a main controller 202 including a processor such as a CPU, a display information output controller 203, and a computer including a timer (not illustrated) that measures time. The control circuit 201 is mounted on the inside of the frame 119 (FIG. 3).

The memory 212 is comprised of, for instance, a nonvolatile rewritable storage, and stores a control program for the robot 1.

The main controller 202 executes the control program for the robot 1 stored in the memory 212. Thus, the main controller 202 serves as a target location generator 21, a movement path generator 22, a self-location estimator 23, and a drive controller 24.

As described above, the camera 104 and the distance sensor 105 are provided in at least one of the first spherical crown 102 (FIG. 1A) and the second spherical crown 103 (FIG. 1A). Thus, the direction of imaging of the camera 104, and the direction of distance information obtained by the distance sensor 105 can be turned to the same direction as that of the first display 108, the second display 109, and the third display 110 that rotate in conjunction with the first spherical crown 102 (FIG. 1A) and the second spherical crown 103 (FIG. 1A), by rotating the first spherical crown 102 (FIG. 1A) and the second spherical crown 103 (FIG. 1A) by the shaft drive mechanism 206. Consequently, the camera 104 and the distance sensor 105 are capable of capturing an image ahead of part of the robot 1 where the first display 108, the second display 109, and the third display 110 are present, and of obtaining distance information. The camera 104 and the distance sensor 105 output the image captured (hereinafter referred to as the captured image) and the obtained distance information to the main controller 202. The main controller 202 recognizes the presence or absence of the face, the location, and the size of a user based on the captured image obtained from the camera 104, accumulates face recognition results in the memory 212, and manages the face recognition results. The distance sensor 105 is comprised of a distance sensor that obtains distance information indicating distance distribution in the surroundings of the robot 1 by using infrared light or ultrasonic waves, for instance.

The microphone 106 converts sound into an electrical signal, and outputs the electrical signal to the main controller 202. The main controller 202 recognizes the presence or absence of the voice of a user from the voice obtained by the microphone 106, accumulates voice recognition results in the memory 212, and manages the voice recognition results. The main controller 202 checks the data for voice recognition stored in the memory 212 with the obtained voice, and recognizes the contents of voice and a user who has uttered the voice.

The loudspeaker 107 converts an audio electrical signal into physical vibration. The main controller 202 outputs predetermined voice from the loudspeaker 107, and causes the robot 1 to utter the voice.

As described above, the angular speed sensor 120 is provided in the frame 119 (FIG. 3). The angular speed sensor 120 detects an angular speed around each of three directional axes: the directional axis parallel to the direction of gravitational force (the directional axis parallel to the Z-axis illustrated in FIG. 14), the directional axis (the directional axis parallel to the X-axis illustrated in FIG. 14) obtained by projecting the moving direction, of the main body 101, parallel to the moving surface of the main body 101 onto the horizontal plane perpendicular to the direction of gravitational force, and the directional axis perpendicular to the above-mentioned two directions (the directional axis parallel to the Y-axis illustrated in FIG. 14). The angular speed sensor 120 then outputs the angular speed around each directional axis to the main controller 202. In other words, the angular speed sensor 120 detects an angular speed around the Z-axis (angular speed in a yaw direction), an angular speed around the X-axis (angular speed in a roll direction), and an angular speed around the Y-axis (angular speed in a pitch direction). The drive controller 24 of the main controller 202 accumulates the three angular speeds detected by the angular speed sensor 120 to store the three angular speeds in the memory 212, and manages the yaw angle, the roll angle, and the pitch angle of the main body 101. The Y-axis is an example of the horizontal direction perpendicular to the moving direction (X-axis) of the main body 101.

The drive controller 24 of the main controller 202 generates a command based on the information on the voice recognition results, the face recognition results, the distance information of the surrounding environment, the angular speeds around the three axes, and the communication interface 211, and outputs the command to the display information output controller 203, the shaft drive mechanism controller 205, the body drive mechanism controller 207, the weight drive mechanism controller 209, and the communication interface 211. The details related to the main controller 202 will be described later.

The display information output controller 203 displays on the display 204 display information on the facial expression of the robot 1 according to a command outputted from the main controller 202. The display 204 includes the first display 108, the second display 109, and the third display 110 which have been described with reference to FIG. 2.

The shaft drive mechanism controller 205 causes the shaft drive mechanism 206 of the robot 1 to operate according to a command outputted from the main controller 202. The shaft drive mechanism 206 includes the shaft 115, the third gear 126, the drive belt 122, the fourth gear 127, the second motor 121, and the frame 119 which have been described with reference to FIGS. 3 and 6A.

The body drive mechanism controller 207 causes the body drive mechanism 208 of the robot 1 to operate according to a command outputted from the main controller 202. The body drive mechanism 208 includes the first gear 116, the second gear 117, the first motor 118, and the frame 119 which have been described with reference to FIG. 3.

The weight drive mechanism controller 209 causes the weight drive mechanism 210 of the robot 1 to operate according to a command outputted from the main controller 202. The weight drive mechanism 210 includes the weight 114, the third arm 123, the fourth arm 124, the third motor 125, and the frame 119 which have been described with reference to FIGS. 3 and 5.

The communication interface 211 is comprised of a communication device for connecting the robot 1 to the cloud server 2 (FIG. 11). For instance, a communication device via a wireless LAN such as Wi-Fi (registered trademark) may be used as the communication interface 211, however, this is an example. The communication interface 211 communicates with the cloud server according to a command outputted from the main controller 202.

Next, the target location generator 21, the movement path generator 22, the self-location estimator 23, and the drive controller 24 included in the main controller 202 will be described.

Figure 12:
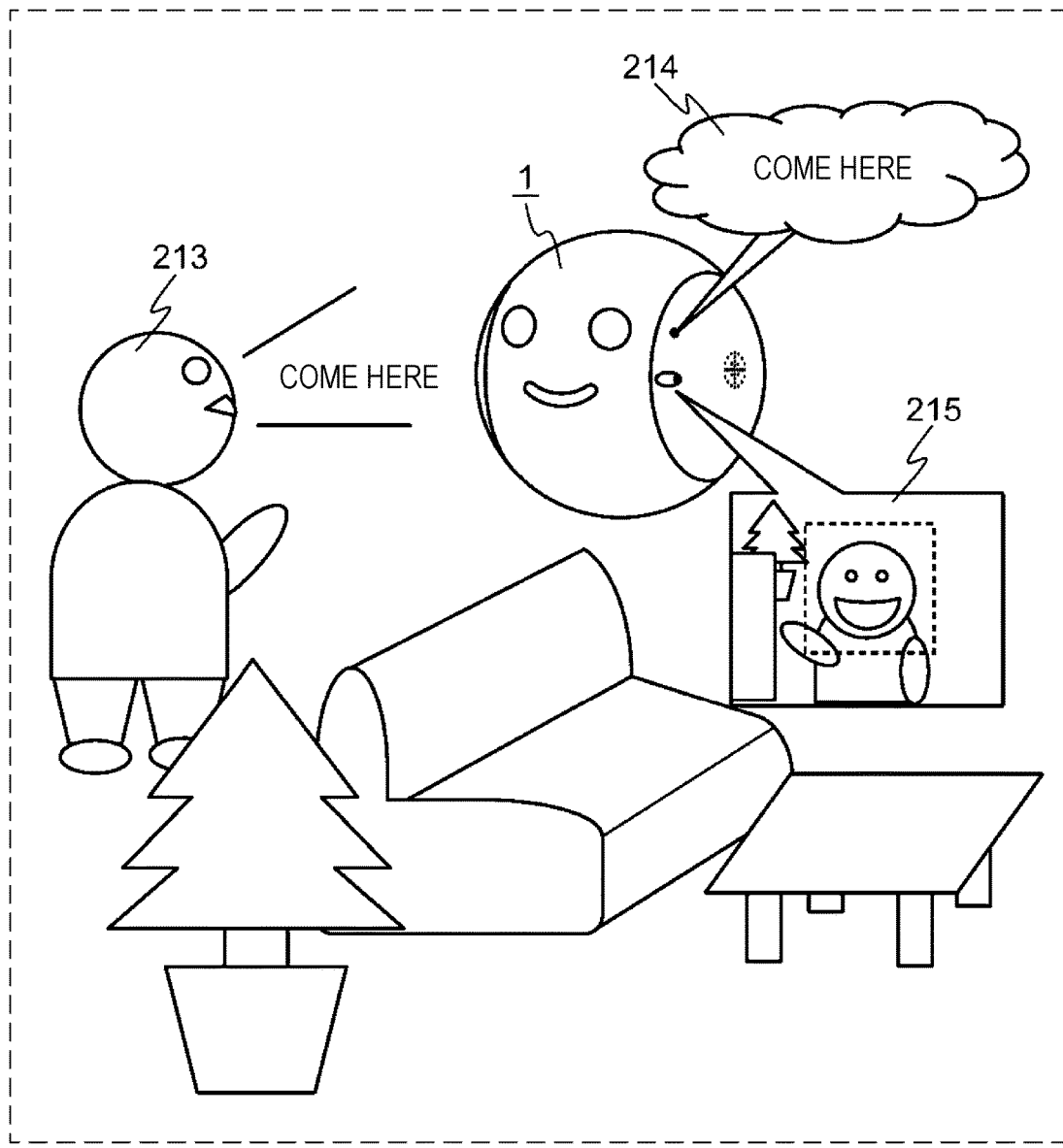
FIG. 12 is an illustration depicting a space in which the robot according to the embodiment of the present disclosure works, and part of processing performed on a first user by the robot.

The target location generator 21 detects the location of the first user 213 (FIG. 12) using the camera 104, the distance sensor 105, the microphone 106, and the memory 212, and generates the detected location of the first user 213 as a target location (an example of a target point) for initiating the movement of the robot 1. The target location generator 21 will be described with reference to FIG. 12. FIG. 12 is an illustration depicting a space in which the robot 1 according to the embodiment of the present disclosure works, and part of processing performed on the first user 213 by the robot 1. The target location generator 21 compares the voice of the first user 213 obtained by the microphone 106 with the voiceprint information of the first user 213 (an example of reference voice data) held in the memory 212, and detects the first user 213. The first user 213 is a user who has uttered a first keyword to the robot 1. For instance, words such as "come here" may be used as the first keyword, the words for calling for the robot 1 to move to the location of the first user 213.

Figure 13:
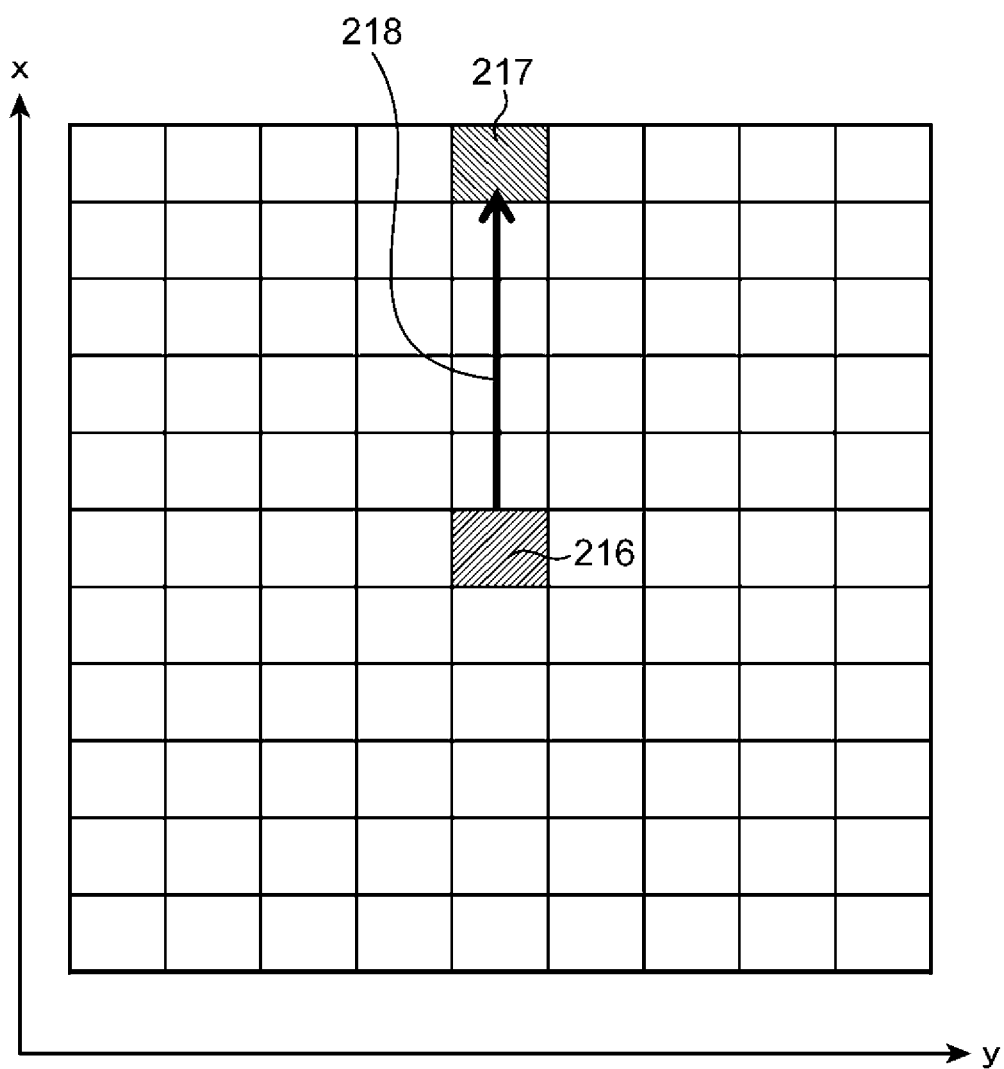
FIG. 13 is a chart illustrating map information, stored in a memory, on the surrounding environment of the robot.

When the first keyword is included in a voice recognition result 214 of the voice uttered by the first user 213, the target location generator 21 performs location detection processing on the first user 213. The target location generator 21 compares a captured image 215 of the camera 104 with face information on the first user 213 held in the memory 212, and recognizes the face of the first user 213 in the captured image 215. After successfully recognizing the face of the first user 213 in the captured image 215, the target location generator 21 extracts an area of the first user 213 in the captured image 215, and identifies the direction of the first user 213 with respect to the robot 1 from the extracted area of the first user 213. The target location generator 21 obtains distance information corresponding to the identified direction from the distance sensor 105, thereby estimating the distance between the robot 1 and the first user 213. Also, from the estimated direction of the first user 213 and distance, the target location generator 21 generates a location at which the first user 213 is present in the real space as a target location 217 (FIG. 13).

The movement path generator 22 generates a movement path for the robot 1 to move to the target location. The movement path generator 22 will be described with reference to FIG. 13. FIG. 13 is a chart illustrating map information, stored in the memory 212, on the surrounding environment of the robot 1. Also, the map information illustrated in FIG. 13 is formed by a two-dimensional coordinate space in which the real space around the robot 1 is defined by the X-axis indicating the forward direction of the robot 1 and the Y-axis indicating the right direction of the robot 1 (the right direction when the robot 1 is viewed from the back to the front). The map information is formed of multiple square cells divided into a grid pattern, and each square cell represents each location. A location 216 indicates the current location of the robot 1, and the target location 217 indicates a target location generated by the target location generator 21. The movement path generator 22 determines an optimal movement path for the robot 1 to move to the target location 217 by publicly known processing (for instance, A* algorithm or Dijkstra's algorithm). For instance, the robot 1 follows the movement path like an arrow 218, and arrives at the target location 217. The two-dimensional coordinate space as illustrated in FIG. 13 may be used for the map information held in the memory 212, or a three-dimensional coordinate space further including the Z-axis indicating the height direction may be used for the map information.

The self-location estimator 23 estimates the current position of the robot 1 in the real space at predetermined time intervals using environmental information on the surroundings of the robot 1 or a movement amount of the robot 1. For instance, the self-location estimator 23 refers to image data obtained by capturing the surroundings by the camera 104, and distance information which indicates the distance to each of objects located in the surroundings of the robot 1 and is detected by the distance sensor 105, and may estimate the current location of the robot 1 using, for instance, visual localization and mapping (V-SLAM). Alternatively, the self-location estimator 23 may estimate the current location of the robot 1 by a publicly known method, such as dead reckoning, using the rotational amount of the first motor 118 (FIG. 3) obtainable from the body drive mechanism controller 207, and an angular speed (angular speed in the yaw angle), obtainable from the angular speed sensor 120, around the directional axis (Z-axis) parallel to the direction of gravitational force of the robot 1.

The self-location estimator 23 sets the estimated current location of the robot 1 in the map information held in the memory 212. As illustrated in FIG. 13, the location 216 which indicates the current location of the robot 1 is updated as needed by the self-location estimator 23.

The drive controller 24 determines a control amount to be outputted as a command to each of the shaft drive mechanism controller 205, the body drive mechanism controller 207, and the weight drive mechanism controller 209, and a control command that controls the display information output controller 203. The control amount includes a first control amount that controls the first motor 118 of the body drive mechanism 208, a second control amount that controls the second motor 121 of the weight drive mechanism 210, and a third control amount that controls the third motor 125 of the shaft drive mechanism 206.

The first control amount is a value that controls the rotational amount of the first motor 118, and the torque and the rotational speed of the first motor 118 increase as the value increases. In this embodiment, the first motor 118 (FIG. 3) is comprised of a motor on which PFM control is performed, and thus the frequency for determining the torque and the rotational speed of the first motor 118 is used as the first control amount. However, this is an example, and when the first motor 118 is comprised of a motor on which PWM control is performed, the duty value is used as the first control amount. The second motor 121 and the third motor 125 are comprised of a servo motor, for instance. Thus, the second control amount and the third control amount are each a command for causing the servo motor to rotate by a specified angle.

The control command is a command for changing the facial expression pattern of the robot 1. Therefore, when changing the facial expression pattern, the drive controller 24 outputs the control command to the display information output controller 203.

Next, the details of the processing performed by the drive controller 24 will be described. The drive controller 24 estimates an effect received by the robot 1 from the floor surface, and determines a control amount to be outputted to each of the display information output controller 203, the shaft drive mechanism controller 205, the body drive mechanism controller 207, the weight drive mechanism controller 209, and the communication interface 211.

First, an overview of floor surface detection processing performed by the robot 1 according to the embodiment of the present disclosure will be described with reference to FIGS. 9, 14, 15, and 19. The drive controller 24 estimates the type of floor surface on which the robot 1 moves, based on the posture of the robot 1 which changes in the period from reception of a movement start command by the robot 1 until the robot 1 actually starts to move.

Figure 14:
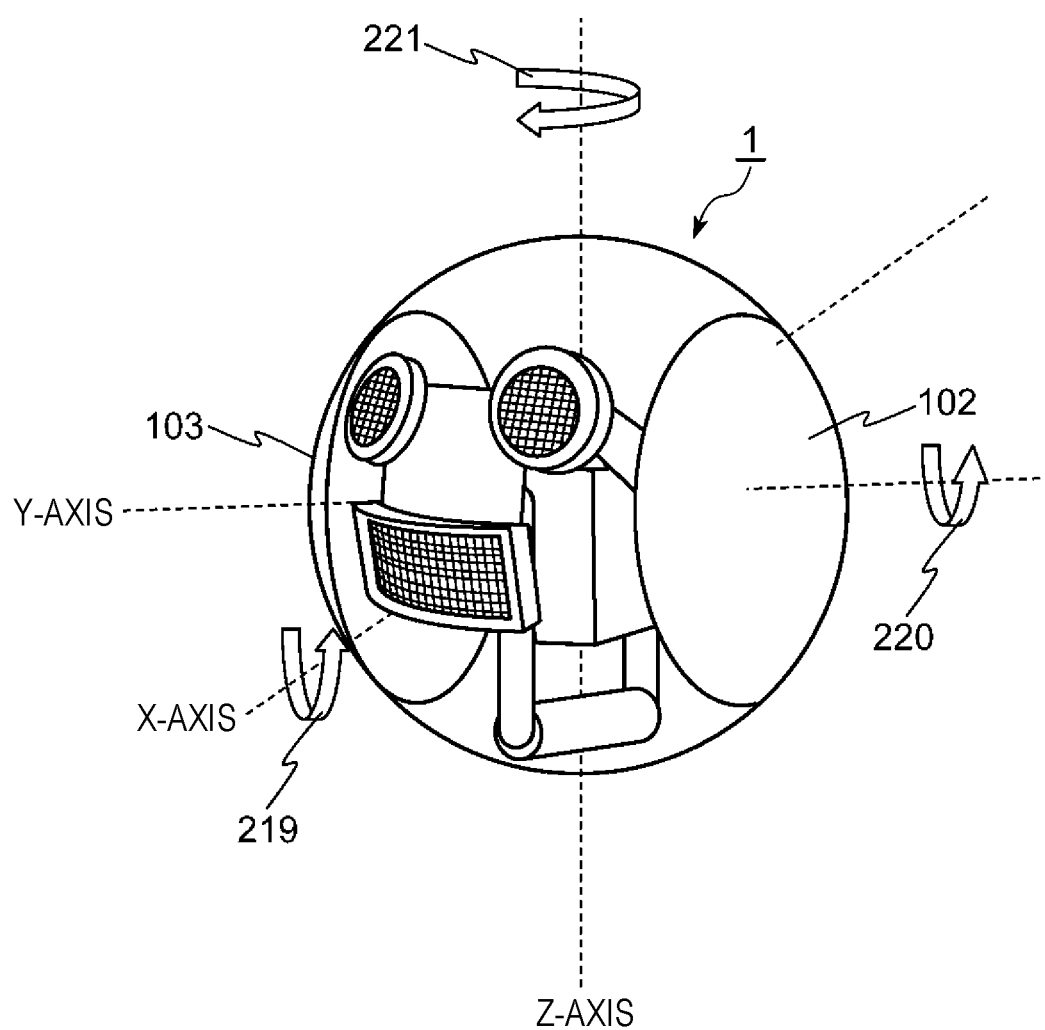
FIG. 14 is an illustration depicting two axes (Y-axis, Z-axis) intersecting perpendicularly to X-axis which is defined by the forward direction of the robot in a three-dimensional space.

FIG. 14 is an illustration depicting two axes (Y-axis, Z-axis) intersecting perpendicularly to X-axis which is defined as the forward direction of the robot 1 in a three-dimensional space. For rotation of the robot 1, a rotational angle around the X-axis, a rotational angle around the Y-axis, and a rotational angle around the Z-axis are called a roll angle (corresponding to an arrow 219), a pitch angle (corresponding to an arrow 220), and a yaw angle (corresponding to an arrow 221), respectively.

As described above, the posture of the robot 1 according to the embodiment of the present disclosure rotates around the Y-axis in the period from reception of a movement start command by the robot 1 until the robot 1 actually starts to move. In the period, the angular speed sensor 120 obtains an angular speed in the pitch direction indicated by the arrow 220 (FIG. 14). As described above, the obtained angular speed is accumulated and stored in the memory 212, and pitch angles of the main body 101 are managed.

Figure 19:
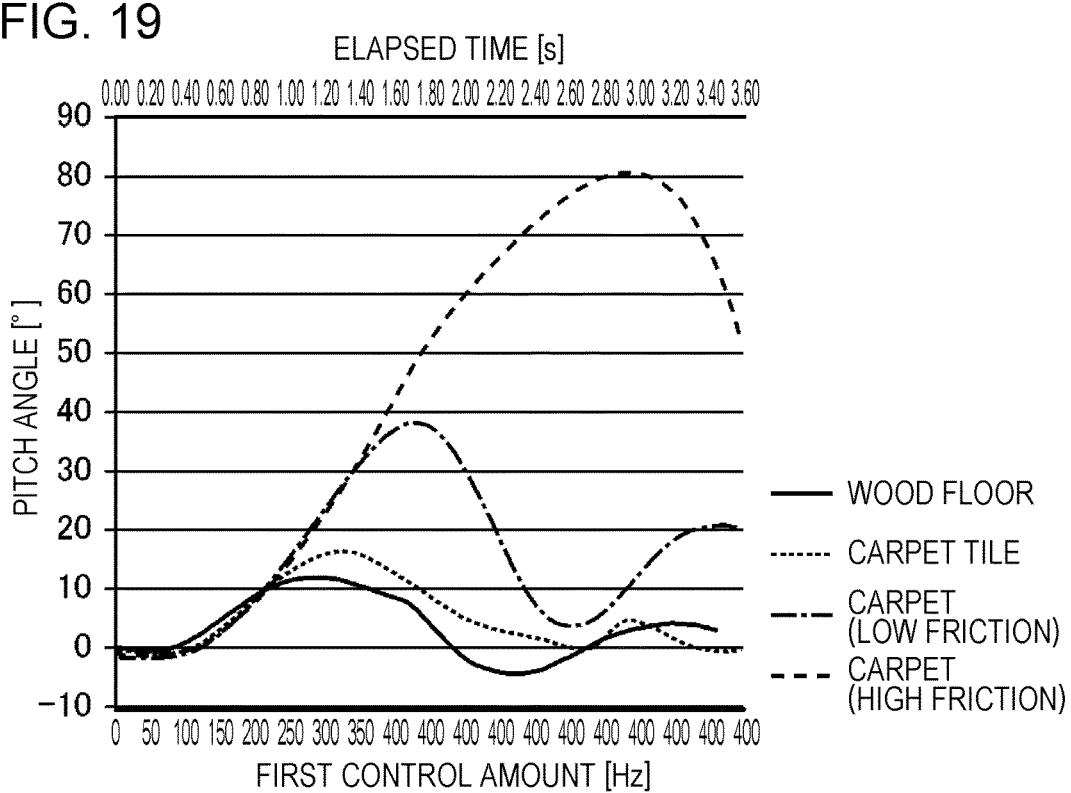
FIG. 19 is a graph illustrating a change in pitch angle for each of floor surfaces during the period from reception of a movement start command by the robot until the robot actually starts to move.

FIG. 19 is a graph illustrating a change in pitch angle for each of floor surfaces during the period from reception of a movement start command by the robot 1 until the robot 1 actually starts to move. In the graph illustrated in FIG. 19, the vertical axis indicates pitch angle, and the lower horizontal axis indicates the first control amount of the body drive mechanism 208. The larger the value of the first control amount for the body drive mechanism 208, the greater force is applied to the floor surface 143 (FIG. 9). Also, since the first control amount in FIG. 19 is increased by a certain amount per unit time, the time axis indicating an elapsed time from reception of a movement start command is set as illustrated in the upper portion of the graph of FIG. 19.

As illustrated in FIG. 19, the posture of the robot 1 at the start of movement changes according to a floor surface. In the robot 1, as illustrated in FIG. 9, the inclination of the internal mechanism such as the first gear 116 and the second gear 117 changes, and thus the weight 114 (FIG. 3) also moves in the direction of the arrow 144, and the center of gravity location of the robot 1 also moves in the forward direction. Referring to FIG. 19, when the total of the force which is changed by the first control amount and applied to the floor surface by the body drive mechanism 208, and the force applied to the floor surface by the change in the center of gravity location of the robot 1 exceeds the force due to an external factor such as friction received from the floor surface, the robot 1 starts to move. Specifically, the greater the force due to an external factor such as friction received from the floor surface, the larger pitch angle of the main body 101 is generated until the robot 1 starts to move. Also, referring to FIG. 19, when the robot 1 successfully moves, decrease in the pitch angle occurs. In other words, the pitch angle of the main body 101 increases until the robot 1 starts to move, and after the robot 1 starts to move, the pitch angle is going to decrease.

Therefore, it can be concluded that the robot 1 starts to move at the timing of occurrence of decrease in the pitch angle, and thus the type of floor surface can be determined by monitoring the change in the pitch angle. Thus, the drive controller 24 estimates the type of floor surface by determining whether or not a maximum angle of the pitch angle (a maximum pitch angle) exceeds a predetermined value according to a floor surface type. The change in the pitch angle may be monitored in the period until the location of the robot 1 is moved by referring to the map information in the memory 212, or a maximum pitch angle in a predetermined time may be monitored.

Figures 15, 16:
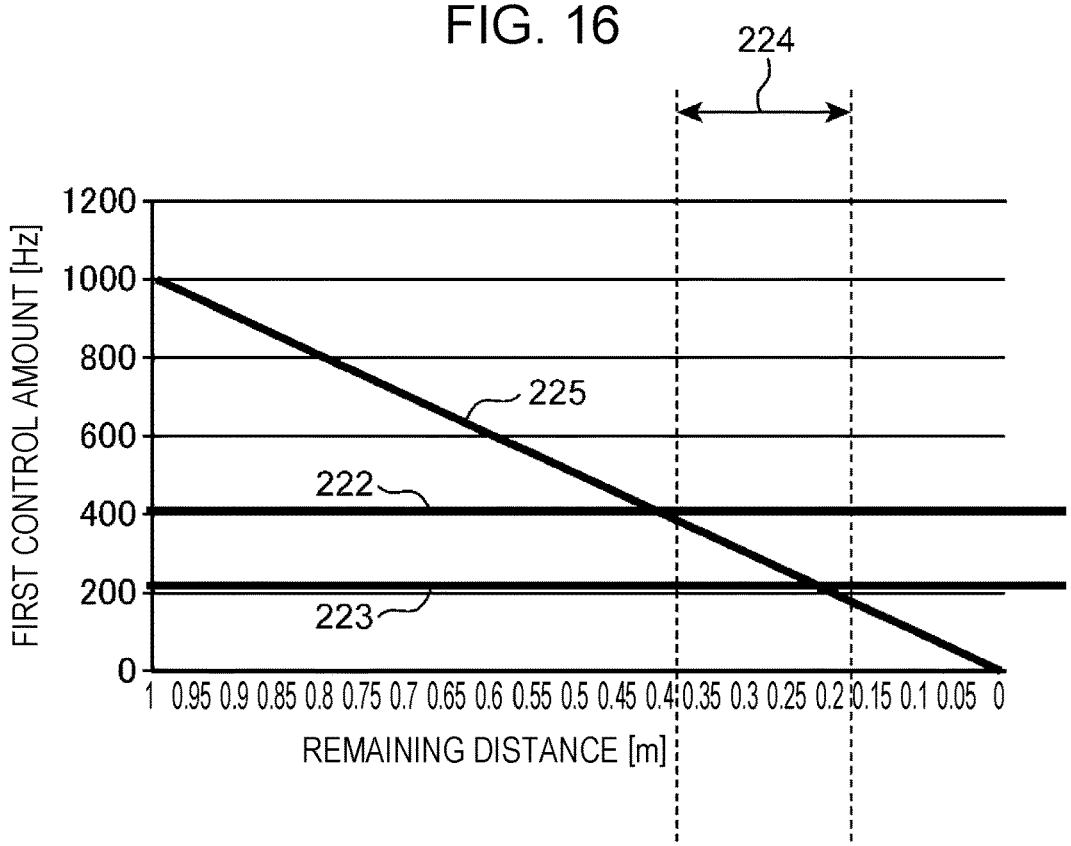
FIG. 15 is a table illustrating an example of the data configuration of a control amount determination database which indicates a relationship between a maximum pitch angle and a minimum control amount according to the type of floor surface.
FIG. 16 is a graph illustrating the difference between stop locations according to the type of floor surface on which the robot moves when a first control amount is determined by trapezoidal control.

FIG. 15 is a table illustrating an example of the data configuration of a control amount determination database T15 which indicates a relationship between a maximum pitch angle and a minimum control amount according to the type of floor surface. The control amount determination database T15 (an example of correspondence relationship) is a database in which one record is assigned to one type of floor surface, and which stores a maximum pitch angle (deg) and a minimum control amount (Hz) in association with each other for each type of floor surface.

The maximum pitch angle and the minimum control amount illustrated in FIG. 15 are obtained by moving the robot 1 on various floor surfaces in advance. In the robot 1 according to the embodiment of the present disclosure, the change in the center of gravity location of the robot 1 associated with the change in the pitch angle of the robot 1 has a significant effect of force by the robot 1 on the floor surface. Therefore, without performing complicated arithmetic using a complicated calculation expression, the drive controller 24 can determine a minimum control amount by using the control amount determination database T15 illustrated in FIG. 15 based on an empirical rule obtained by actually moving the robot 1. However, this is an example, and the drive controller 24 may determine a minimum control amount by calculating external factors such as friction of the floor surface based on the center of gravity location of the robot 1 and the torque generated by the body drive mechanism 208.

As illustrated in FIG. 19, a significant difference in the maximum value of the pitch angle occurs between the cases where the robot 1 is driven on a floor surface with low friction, such as wood floor and where the robot 1 is driven on a floor surface with high friction, such as shag carpet. Specifically, for instance, under the environment where the property of the floor surface is limited, such as a home environment, it is possible to predict whether the floor surface on which the robot 1 stands is wood floor or carpet from the maximum value of the pitch angle.

Next, the generation processing for the first control amount in the robot 1 according to the embodiment of the present disclosure will be described with reference to FIGS. 13, 16, 17, and 18.

The body drive mechanism controller 207 causes the body drive mechanism 208 of the robot 1 to operate according to the first control amount outputted from the main controller 202. The first control amount controls the first motor 118 included in the body drive mechanism 208. The body drive mechanism controller 207 obtains the rotational amount of the first motor 118. The rotational amount of the first motor 118 varies directly with the first control amount. The body drive mechanism controller 207 may obtain the rotational amount of the first motor 118 from an encoder attached to the first motor 118 or may calculate the rotational amount of the first motor 118 by a publicly known calculation method according to the specifications of the first motor 118.

The first control amount varies according to the self-location estimated by the self-location estimator 23 and the remaining distance to a target location generated by the target location generator 21. Here, the first control amount is updated as needed not to fall below a minimum control amount corresponding to a maximum pitch angle determined by referring to the control amount determination database T15. Therefore, the robot 1 can arrive at a target location without being stopped in the middle of move due to an external factor of the floor surface.

As illustrated in FIG. 13, the remaining distance to the target location is calculated from the target location 217 generated by the target location generator 21 and the location 216 of the robot 1 updated as needed by the self-location estimator 23. For instance, the remaining distance to the target location 217 is calculated by multiplying the distance per square cell by the number of one or multiple square cells which connect the location 216 of the robot 1 and the target location in the movement path generated by the movement path generator 22. Alternatively, the remaining distance to the target location 217 may be determined by the Euclidean distance between the target location 217 and the location 216 of the robot 1.

Here, the reason why the minimum control amount stored in the control amount determination database T15 is to be referred will be described. The robot 1 according to the embodiment of the present disclosure has a spherical shape as illustrated in FIG. 1A. Therefore, when the robot 1 attempts to suddenly stop, the robot 1 may significantly wobble in the forward or backward direction due to an inertial force, and may pass the target location 217. In order to stop smoothly, the robot 1 needs to gradually decelerate particularly immediately before stopping. Thus, the drive controller 24 moves the robot 1 to the target location 217 by applying trapezoidal control or S-curve control.

Next, the difference between stop locations according to the type of floor surface will be described with reference to FIG. 16. FIG. 16 is a graph illustrating the difference between stop locations according to the type of floor surface on which the robot 1 moves when the first control amount is determined by trapezoidal control.

In FIG. 16, the vertical axis indicates the first control amount (Hz), and the horizontal axis indicates the remaining distance to the target location. A line 225 indicates the first control amount. As indicated by the line 225, the first control amount is decreased by a certain rate of change as the remaining distance decreases. In the graph of FIG. 16, the robot 1 moves on carpet or wood floor according to the first control amount indicated by the line 225.

In the case of movement on carpet, when the first control amount falls below, for instance, the value (400 Hz) indicated by a line 222, the robot 1 stops. Also, in the case of movement on wood floor, when the first control amount falls below, for instance, the value (200 Hz) indicated by a line 223, the robot 1 stops because the wood floor has lower friction than that of the carpet.

A distance 224 indicates the difference between the stop location of the robot 1 when the robot 1 is moved on carpet by changing the first control amount as indicated by the line 225, and the stop location of the robot 1 when the robot 1 is moved on wood floor by changing the first control amount as indicated by the line 225.

The difference between the stop locations indicated by the distance 224 is caused by an external force, such as friction, given by the floor surface to the robot 1. Therefore, the robot 1 needs to maintain the first control amount at least the minimum control amount until the robot 1 arrives at the target location. In other words, when the robot 1 is moved on carpet, it is possible to prevent stopping of the robot 1 short of the target location provided that the first control amount is maintained at least 400 Hz which is a minimum control amount corresponding to carpet. Also, when the robot 1 is moved on wood floor, it is possible to prevent stopping of the robot 1 short of the target location provided that the first control amount is maintained at least 200 Hz which is a minimum control amount corresponding to wood floor. Thus, stopping of the robot 1 short of the target location can be avoided by setting the first control amount to at least a minimum control amount according to the type of floor surface, and thus the robot 1 can be smoothly moved to the target location.

The drive controller 24 generates the first control amount according to the remaining distance to the target location and the minimum control amount. Even when the type of floor surface is different, the robot 1 performs a similar operation, thus the drive controller 24 determines the first control amount, for instance, by S-curve control using the following Expression (1).

For the method of calculating the first control amount, a control method which varies according to floor surface may be used. For instance, when the floor surface is wood, wobbling of the robot 1 may occur in the forward or backward direction at the time of stop because the effect of friction from the floor surface is less. In this case, it is better to set a smaller amount of change in the first control amount immediately before stop. Thus, in this embodiment, the first control amount is determined using Expression (1). Also, when the floor surface is carpet, wobbling of the robot 1 is unlikely to occur in the forward or backward direction at the time of stop because the effect of friction from the floor surface is large. In this case, the first control amount may be determined using trapezoidal control. However, in the following example, the first control amount is to be determined by S-curve control of Expression (1) before the robot 1 arrives at the target location regardless of the type of floor surface.

$$\text{The first control amount} = (\text{SIN}(3*\pi/2 - \pi/L*d) + 1) * (\text{Max} - \text{min})/2 + \text{min} \quad (1)$$

L [m] is the deceleration start distance which is a predetermined distance from a target position for starting deceleration control, d [m] is the remaining distance from the location of the robot 1 to the target location, Max [Hz] is the first control amount at the deceleration start location which is the location indicated by deceleration control distance, and min [Hz] is the minimum control amount. Also, the value calculated using the technique described above with reference to FIG. 13 may be used as d[m] which is the distance from the location of the robot 1 to the target location. Also, the value determined by referring to the above-mentioned control amount determination database T15 may be used as min [Hz] which is the minimum control amount. Alternatively, in the aspect, the reduction gear ratio in trapezoidal control may be changed without being limited to Expression (1).

Figure 17:
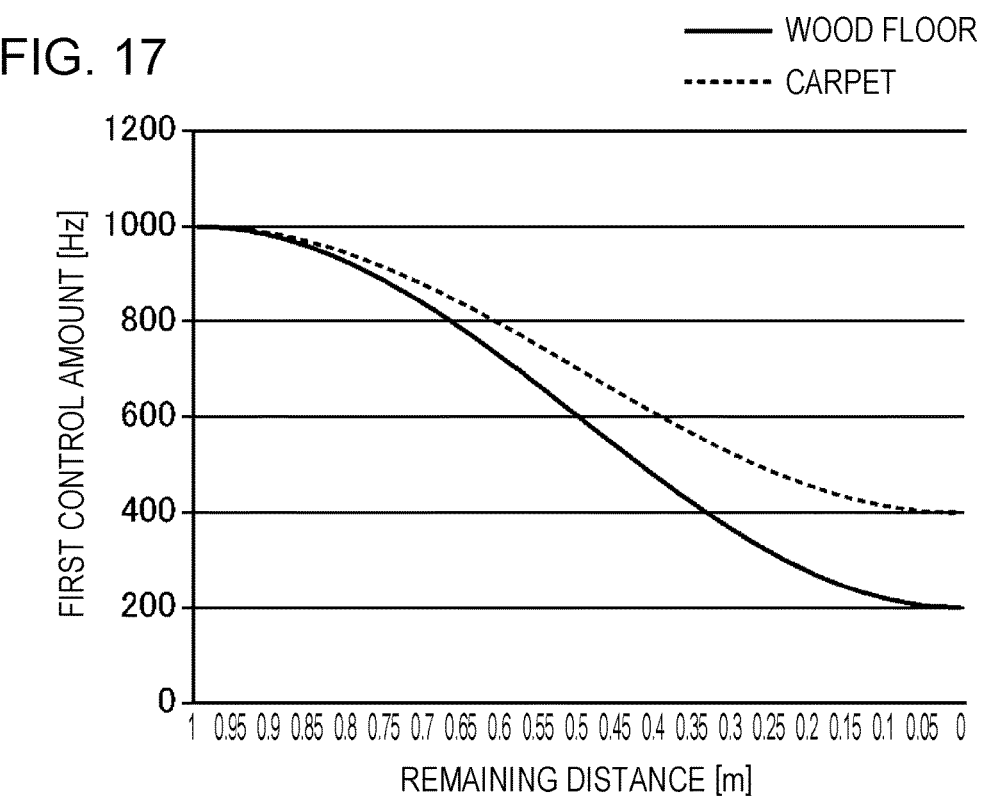
FIG. 17 is a graph illustrating a relationship between a remaining distance from a deceleration start location to a target location and the first control amount when the robot is stopped at a target location using Expression (1) for each of wood floor and carpet.

FIG. 17 is a graph illustrating a relationship between a remaining distance to a target location in a range from a deceleration start location to the target location and the first control amount when the robot is stopped at a target location using Expression (1) for each of wood floor and carpet. In FIG. 17, the vertical axis indicates the first control amount [Hz], and the horizontal axis indicates the remaining distance [m] to the target location.

In the graph, L [m] which is the deceleration start distance from the target location is 1 [m], the first control amount at the deceleration start location is 1000 [Hz], the minimum control amount with the floor surface of carpet is 400 [Hz], and the minimum control amount with the floor surface of wood floor is 200 [Hz], and arithmetic results when these values are substituted into Expression (1) are illustrated.

As indicated by the curve of carpet (dotted line) and the curve of wood floor (solid line), it is seen that the first control amount is gradually decreased in a sign curve from the deceleration start location at 1 [m] point to the target location at 0 [m] point. Also, for wood floor and carpet, the first control amounts at the target location are 200 [Hz] and 400 [Hz], respectively, and each first control amount is maintained at least the minimum control amount until the robot 1 arrives at the target location. Therefore, the robot 1 is prevented from stopping short of the target location. In the case of wood floor, when the remaining distance is less than 0.15 [m], the slope of the first control amount becomes suddenly gentle, and prevention of wobbling of the robot 1 at the target location is achieved.

Figure 18:
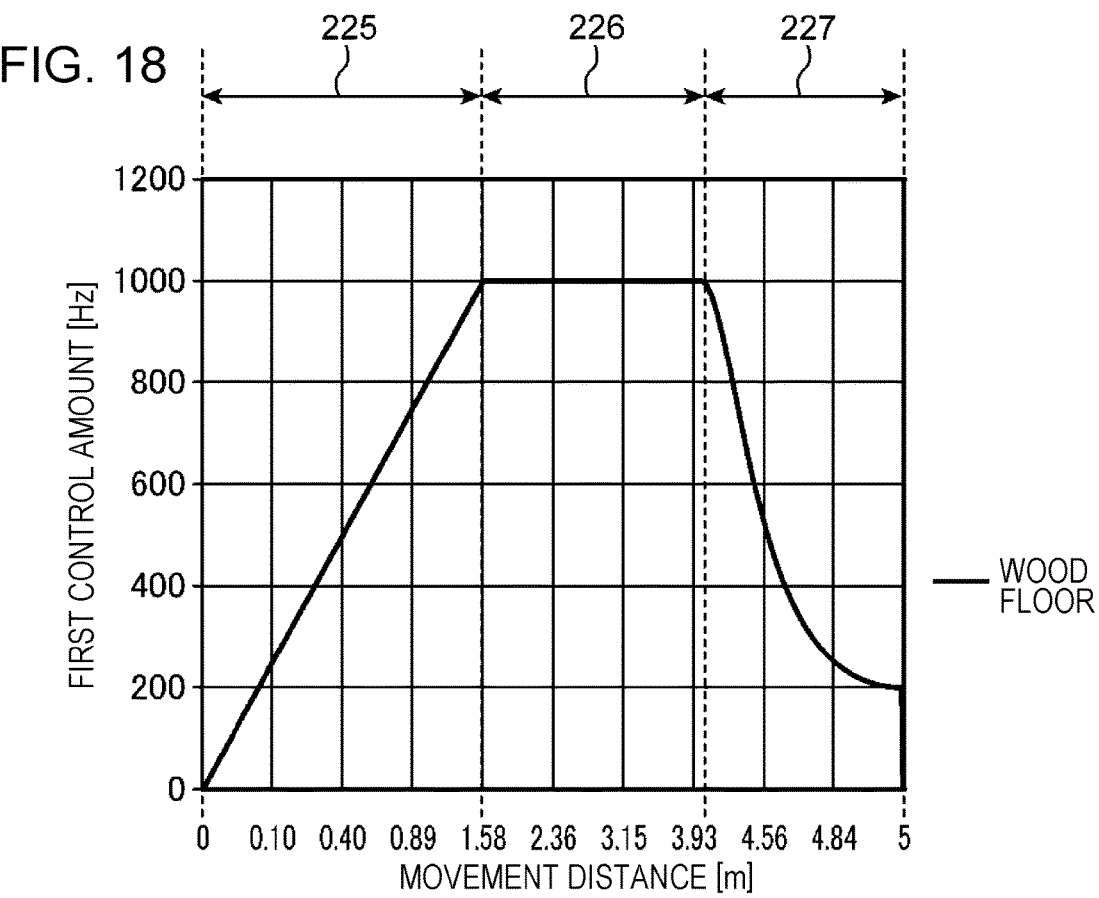
FIG. 18 is a graph illustrating a variation in the first control amount in the period from start of movement to stop of the robot according to the embodiment of the present disclosure.

FIG. 18 is a graph illustrating a variation in the first control amount in the period from start of movement to stop of the robot 1 according to the embodiment of the present disclosure. In FIG. 18, the vertical axis indicates the first control amount [Hz], and the horizontal axis indicates movement distance [m]. FIG. 18 illustrates the change in the first control amount, for instance when the robot 1 moves 5 m. Three control methods indicated in areas 225, 226, and 227 are applied to the first control amount from the start of movement to stop.

The area 225 is an acceleration area. In the area 225, the first control amount is an acceleration control amount which is increased with time at a constant rate of change. Specifically, in the area 225, the first control amount is increased by trapezoidal control. The area 226 is a uniform speed area. In the area 226, the first control amount is a uniform speed control amount which maintains a maximum control amount. The maximum control amount refers to a predetermined first control amount corresponding to an upper limit speed of the robot 1. As the upper limit speed, a value is used, which has been determined in advance in consideration of the performance of the first motor 118 and the safety of the robot 1 at the time of moving.

The area 227 is a deceleration area. In the area 227, the first control amount is a deceleration control amount determined by S-curve control indicated by Expression (1).

When the robot 1 starts to move, the drive controller 24 increases the first control amount by trapezoidal control, and when the first control amount reaches a maximum control amount (1000 [Hz]), the drive controller 24 maintains the first control amount at the maximum control amount. When the robot 1 arrives at the deceleration start location, the drive controller 24 decreases the first control amount in accordance with Expression (1). Consequently, the drive controller 24 is capable of causing the robot 1 to quickly arrive at the target location and stopping the robot 1 accurately at the target location. In addition, when the first control amount reaches the maximum control amount, the drive controller 24 does not increase the first control amount any more, thus the safety of the robot 1 can be secured.

When the distance from the movement start location to the target location is short, the robot 1 may arrive at the deceleration start location before the first control amount reaches the maximum control amount. In this case, the drive controller 24 may calculate the first control amount by substituting the first control amount at the deceleration start location into Max of Expression (1). Consequently, the drive controller 24 can cause the robot 1 to stop at the target location smoothly and accurately.

Referring back to FIG. 11, the weight drive mechanism controller 209 causes the weight drive mechanism 210 to operate according to a second control amount outputted from the main controller 202. The second control amount controls the rotational amount of the third motor 125 included in the weight drive mechanism 210. The rotational amount of the third motor 125 is limited by a motion range of the weight 114.

When the current position of the robot 1 obtained from the self-location estimator 23 deviates to the left from the movement path generated by the movement path generator 22, the main controller 202 generates a second control amount to incline the weight 114 to the right, and when the current position of the robot 1 deviates to the right, the main controller 202 generates a second control amount to incline the weight 114 to the left. At this point, the second control amount is a predetermined value serving as a command to incline the weight in a horizontal direction. The predetermined value serving as a command indicates the value of one of divided pieces of the motion range of the weight drive mechanism 210, where the number of pieces is a predetermined number. The main controller 202 may dynamically calculate the second control amount by a publicly known method such as feedback control while referring to the current location of the robot 1 obtained from the self-location estimator 23.

The shaft drive mechanism controller 205 causes the shaft drive mechanism 206 of the robot 1 to operate according to a third control amount outputted from the main controller 202. The third control amount controls the rotational amount of the second motor 121 included in the shaft drive mechanism 206. The rotational amount of the second motor 121 is limited by a motion range of the first display 108, the second display 109, and the third display 110.

When the target location generator 21 detects the first user 213 (FIG. 12), the drive controller 24 generates the third control amount for inclining the camera 104 and the distance sensor 105 in the direction of the arrow 130 (FIG. 6B) and the arrow 133 (FIG. 6C) as necessary. At this point, the third control amount is set to a predetermined value serving as a command for vertically rotating the first spherical crown 102, the second spherical crown 103, the camera 104, the distance sensor 105, the microphone 106, the first display 108, the second display 109, and the third display 110 which are connected to the shaft drive mechanism 206. The pre-determined value serving as a command indicates the value of one of divided pieces of the motion range of the shaft drive mechanism 206, where the number of pieces is a predetermined number.

Figure 20:
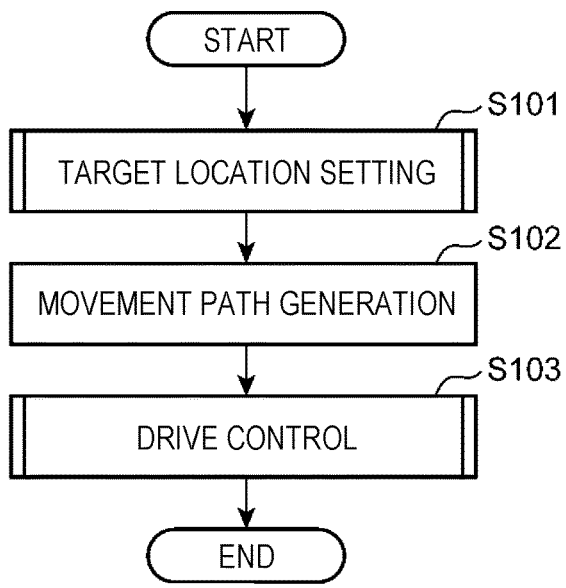
FIG. 20 is a flowchart illustrating the main routine of the robot according to the embodiment of the present disclosure.

Hereinafter, processing steps performed by the robot 1 in the embodiment will be described with reference to FIGS. 20 to 22, the processing steps including identifying a user from voice and face, setting the location of the identified user as a target location, and moving to the target location without stopping on the way while grasping the current location of the robot 1. FIG. 20 is a flowchart illustrating the main routine of the robot 1 according to the embodiment of the present disclosure.

Referring to FIG. 20, the target location generator 21 performs target location setting processing (step S101).

Figure 21:
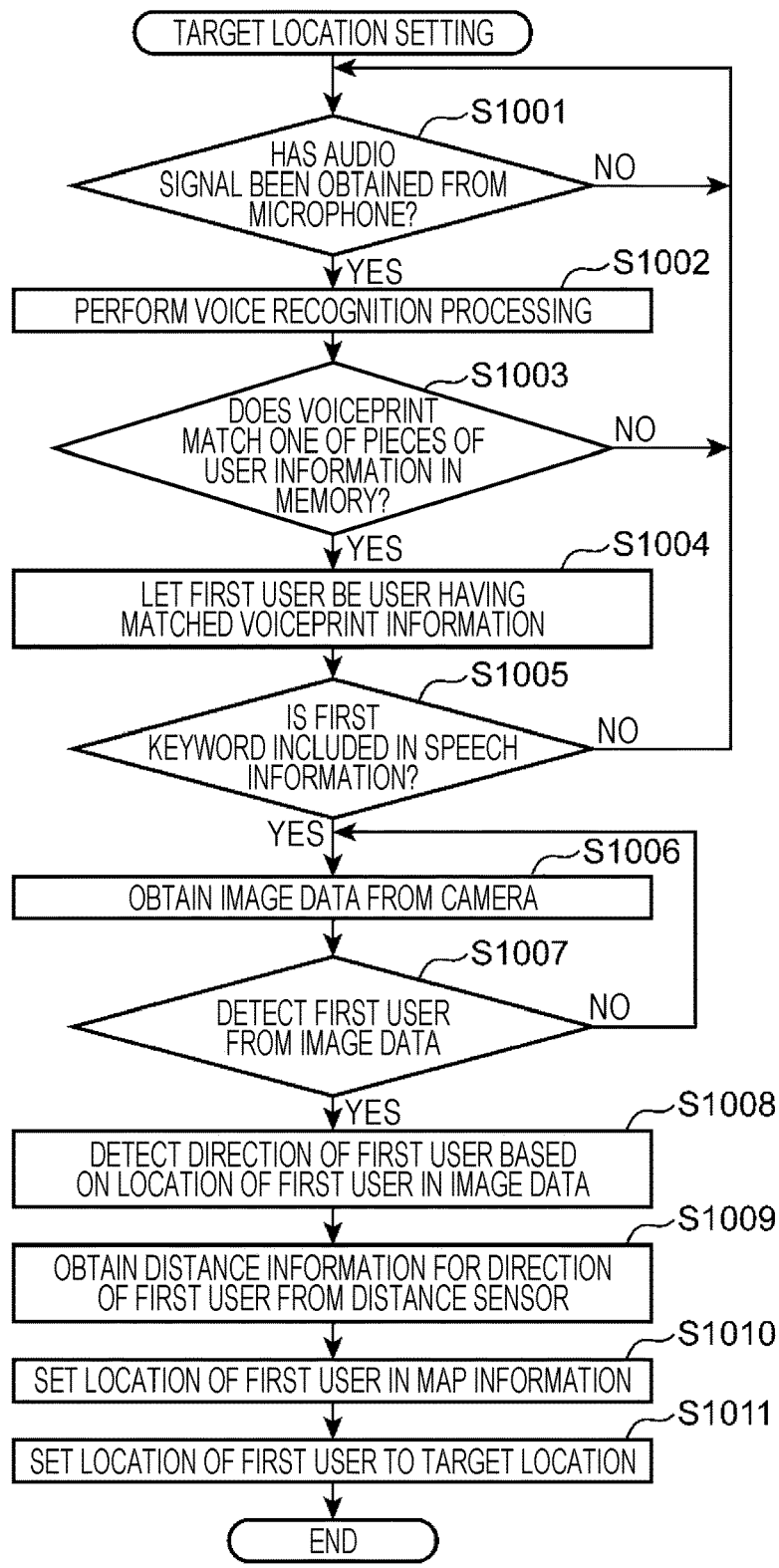
FIG. 21 is a flowchart illustrating target location setting processing in FIG. 20.

FIG. 21 is a flowchart illustrating the target location setting processing in FIG. 20.

The microphone 106 obtains audio signal in the surrounding environment (Yes in step S1001), and outputs the audio signal to the main controller 202. The target location generator 21 performs voice recognition processing on the obtained audio signal (step S1002). The voice recognition processing extracts voice data which indicates a temporal change in the sound pressure of the voice uttered by a user, and utterance information which indicates the contents of utterance of the user contained in the voice data in text format. When an audio signal is not obtained by the microphone 106, the target location generator 21 repeats the processing in step S1001 until an audio signal is obtained (No in step S1001).

The target location generator 21 determines whether or not the voice data extracted by the voice recognition processing matches any one of one or multiple pieces of voiceprint information pre-stored in the memory 212 as user information of one or multiple users. When it is determined that the extracted voice data matches the voiceprint information (Yes in step S1003), the target location generator 21 determines that a user with the matched voiceprint information is the first user 213 (step S1004). When the extracted voice data does not match any of the pieces of voiceprint information stored in the memory 212 (No in step S1003), the target location generator 21 causes the processing to return to S1001.

When an utterance first keyword is contained in the voice data of the first user 213 obtained by the voice recognition processing (Yes in step S1005), the target location generator 21 obtains image data from the camera 104 (step S1006). When the first keyword is not contained in the voice data of the first user 213 obtained by the voice recognition processing (No in step S1005), the target location generator 21 causes the processing to return to S1001.

The target location generator 21 performs face recognition processing to compare each of one or multiple face images contained in the image data obtained from the camera 104 with the characteristic quantity of the face of the first user 213 stored in the memory 212 as the user information of the first user 213, and detects the first user 213 from the image data (step S1007).

When the first user 213 is detectable from the image data (Yes in step S1007), the target location generator 21 detects the direction of the first user 213 with respect to the robot 1 from the location of the first user 213 in the image data (step S1008).

Of the distance information obtained by the distance sensor 105, the target location generator 21 obtains distance information in the direction in which the first user 213 is present, as the distance information on the first user 213 (step S1009). The target location generator 21 detects the location of the first user 213 in the real space around the robot 1 from the direction and the distance information of the first user 213, and plots the detected location in the map information (FIG. 13) (step S1010).

The target location generator 21 sets the plotted location as the target location 217 of the robot 1 (step S1011). Also, when the first user 213 is not detectable from the image data (No in step S1007), the target location generator 21 causes the processing to return to S1006.

Next, generation of a movement path for the robot 1 to move to the target location will be described. Referring to FIG. 20, the movement path generator 22 refers to the map information held by the memory 212, and generates the location 216 of the robot 1 and a movement path to the target location 217 (step S102). It is to be noted that the locations of obstacles in the surroundings of the robot 1 are also plotted in the map information based on measuring results of the distance sensor 105. Thus, when an obstacle is present on the movement path between the location 216 of the robot 1 and the target location 217, the movement path generator 22 may generate a movement path which is safe and the shortest, allowing a space at least a predetermined distance between the robot 1 and the obstacle.

Next, the drive control processing of the robot 1 will be described. Referring to FIG. 20, the drive controller 24 performs the drive control processing (step S103). FIG. 22 is a flowchart illustrating the drive control processing in FIG. 20.

The drive controller 24 obtains an angular speed in the pitch direction detected by the angular speed sensor 120 (step S1101). Next, the drive controller 24 calculates a rate of change in the pitch angle per unit time from the obtained angular speed in the pitch direction (step S1102).

For instance, the angular speed sensor 120 detects an angular speed in the pitch direction at uniform sampling intervals. In this case, the drive controller 24 can calculate an angular speed in the pitch direction at one sample point detected by the angular speed sensor 120 as the rate of change in the pitch angle per unit time. Alternatively, when a time different from the sampling interval is used as the unit time, the drive controller 24 may calculate a rate of change in the pitch angle per unit time by accumulating the angular speeds in the pitch direction at sample points for unit time, detected by the angular speed sensor 120.

Next, the drive controller 24 accumulates rates of change in the pitch direction per unit time (step S1103), and calculates the current pitch angle of the main body 101. Referring to FIG. 9, the angular speed sensor 120 detects an angular speed in the pitch direction, where the angular speed has a positive value, for instance, when the main body 101 rotates in the clockwise direction as viewed in VIA direction, and has a negative value when the main body 101 rotates in the counterclockwise direction as viewed in VIA direction. In this case, the drive controller 24 can detect a pitch angle of the main body 101 by simply accumulating the angular speeds in the pitch direction detected by the angular speed sensor 120. It is to be noted that the calculated current pitch angle is stored in the memory 212 in a time series.

When the pitch angle has continuously decreased predetermined number of times (Yes in step S1104), the drive controller 24 identifies a maximum pitch angle from pitch angles stored in the memory 212 in a time series (step S1105). Here, when the pitch angle has continuously decreased predetermined number of times, the drive controller 24 assumes that the pitch angle has reached a peak as illustrated in FIG. 19. For instance, a predetermined value, which allows to assume that the pitch angle has reached a peak, is used as the predetermined number of times.

Next, the drive controller 24 refers to the control amount determination database T15 to determine a minimum control amount corresponding to the identified maximum pitch angle (step S1106).

On the other hand, when the pitch angle has not continuously decreased predetermined number of times (No in step S1104), the drive controller 24 causes the processing to proceed to step S1107 without performing the processing in step S1105 and step S1106.

Next, the self-location estimator 23 estimates the self-location of the robot 1 from the image data obtained by the camera 104 and the distance information obtained by the distance sensor 105 (step S1107). Here, the self-location estimator 23 may estimate the self-location using V-SLAM.

If the image data obtained by the camera 104 does not sufficiently show a group of characteristic points indicating the objects in the surroundings of the robot 1, the self-location estimator 23 is unable to estimate the self-location using V-SLAM. In this case, the self-location estimator 23 obtains the rotational amount of the first motor 118 from the body drive mechanism controller 207 as well as calculates the yaw angle of the robot 1 from an angular speed in the yaw angle detected by the angular speed sensor 120, and performs publicly known dead reckoning. Specifically, the self-location estimator 23 interpolates the self-location of the robot 1 by dead reckoning during a period from a point at which the self-location is lost by V-SLAM until the self-location is detected again by V-SLAM. Thus, the self-location estimator 23 can recognize the self-location of the robot 1 all the time.

Next, the drive controller 24 refers to the map information stored in the memory 212, and calculates the remaining distance using the coordinates of the location 216 of the robot 1, the coordinates of the target location 217, and the movement path generated by the movement path generator 22 (step S1108). The remaining distance is calculated by multiplying the distance per square cell by the number of square cells indicating the movement path that connects the coordinates of the location 216 of the robot 1 and the coordinates of the target location 217.

When the robot 1 has arrived at the target location 217 (Yes in step S1109), the drive controller 24 generates a stop control amount as the first control amount (step S1110), and outputs the generated stop control amount to the body drive mechanism controller 207 (step S1116). When outputting the stop control amount to the body drive mechanism controller 207 (Yes in step S1117), the drive controller 24 terminates the processing. Here, for instance, 0 [Hz] may be used as the stop control amount.

On the other hand, when the robot 1 has not arrived at the target location 217 (No in step S1109), the drive controller 24 determines whether or not the remaining distance from the location 216 of the robot 1 to the target location 217 is less than or equal to the deceleration start distance (step S1111). When the remaining distance is less than or equal to the deceleration start distance (Yes in step S1111), the drive controller 24 generates a deceleration control amount according to the remaining distance using Expression (1) (step S1112), and outputs the generated deceleration control amount as the first control amount to the body drive mechanism controller 207 (step S1116).

Here, the drive controller 24 substitutes the remaining distance from the location 216 of the robot 1 to the target location 217, the deceleration start distance, the minimum control amount determined in step S1106, and the first control amount at the deceleration start location into d, L, min, and MAX, respectively of Expression (1), and generates a deceleration control amount. The deceleration control amount is the first control amount generated in the area 227 of FIG. 18.

When the remaining distance from the location 216 of the robot 1 to the target location 217 exceeds the deceleration start distance (No in step S1111), the drive controller 24 determines whether or not the first control amount is less than the maximum control amount (step S1113). When the first control amount is less than the maximum control amount (Yes in step S1113), the drive controller 24 generates an acceleration control amount as the first control amount (step S1114), and outputs the generated acceleration control amount to the body drive mechanism controller 207 (step S1116). The acceleration control amount is the first control amount generated in the area 225 of FIG. 18. Here, the drive controller 24 may generate an acceleration control amount by increasing the first control amount at a constant rate of change as time passes.

When the first control amount is greater than or equal to the maximum control amount (No in step S1113), the drive controller 24 generates a uniform speed control amount as the first control amount (step S1115), and outputs the generated uniform speed control amount to the body drive mechanism controller 207 (step S1116). The uniform speed control amount is the first control amount generated in the area 226 of FIG. 18.

When the stop control amount has not been outputted to the body drive mechanism controller 207 (No in step S1117), the drive controller 24 determines whether or not a minimum control amount has been determined by the processing in step S1106 (step S1118). When a minimum control amount has not been determined (No in step S1118), the drive controller 24 causes the processing to return to step S1101 because the robot 1 has not started to move yet.

On the other hand, when a minimum control amount has been determined (Yes step S1118), the drive controller 24 causes the processing to return to step S1107 because the robot 1 has started to move.

On the other hand, when the stop control amount has been outputted to the body drive mechanism controller 207 (Yes in step S1117), the drive controller 24 terminates the processing because the robot 1 has arrived at the target location 217.

Figure 22:
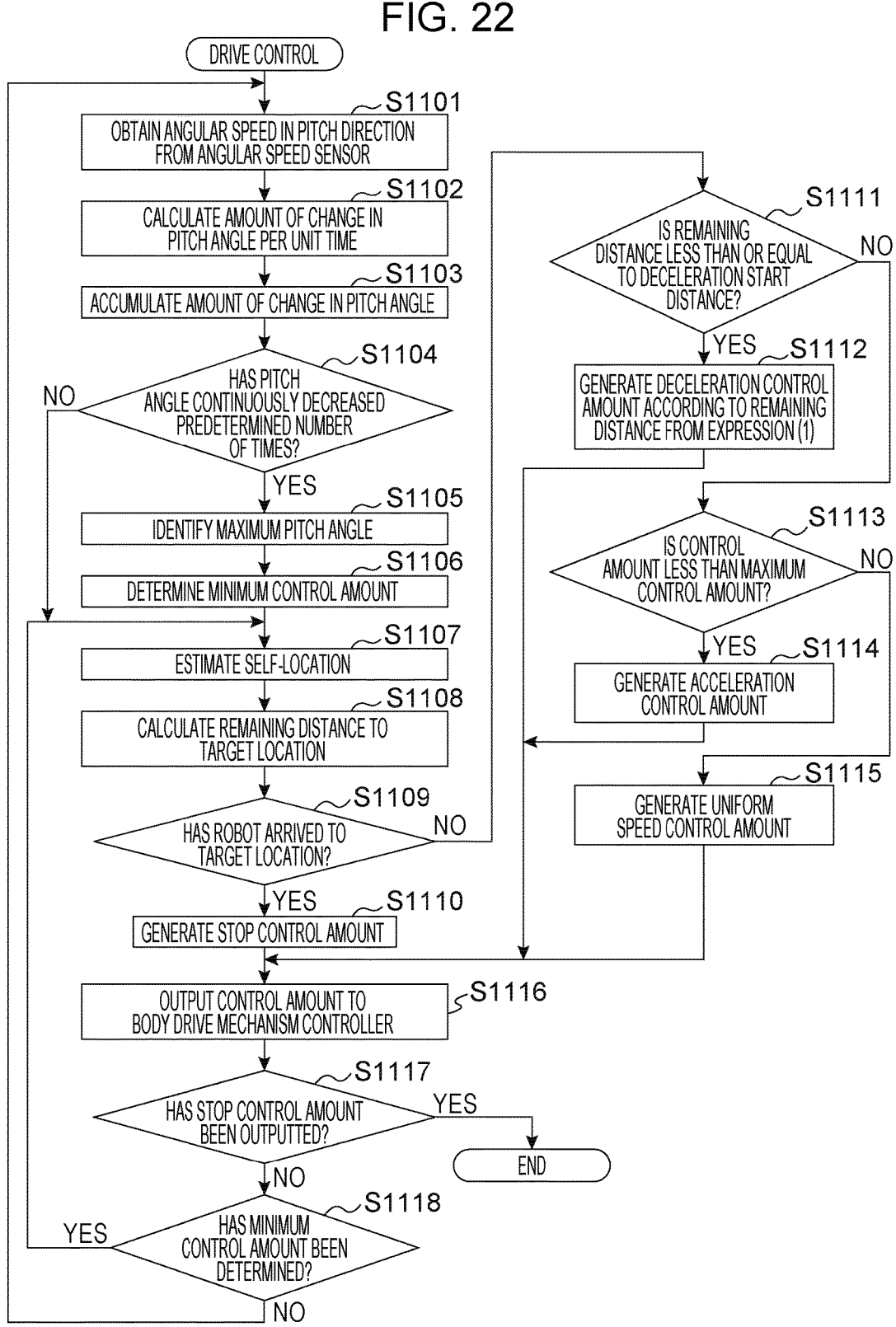
FIG. 22 is a flowchart illustrating drive control processing in FIG. 20.

Referring to the flowchart of FIG. 22, when the robot 1 has not started to move yet, the loop of No in step S1104, No in step S1009, No in step S1111, Yes in step S1113, No in step S1117, and No in step S1118 is repeated, and the first control amount is increased at a constant rate of change. Accordingly, the pitch angle of the main body 101 increases.

Also, during acceleration control after the start of move, the loop of No in step S1109, No in step S1111, Yes in step S1113, No in step S1117, and Yes in step S1118 is repeated, and the robot 1 moves at a constant acceleration.

During uniform speed control, the loop of No in step S1109, No in step S1111, No in step S1113, No in step S1117, and Yes in step S1118 is repeated, and the robot 1 moves at a constant speed.

During deceleration control, the loop of No in step S1109, Yes in step S1111, No in step S1117, and Yes in step S1118 is repeated, and the robot 1 is decelerated in accordance with S-curve control indicated by Expression (1).

As described above, with the robot 1 according to the embodiment, a minimum control amount corresponding to a maximum pitch angle of the main body 101 detected by the angular speed sensor 120 is determined, and the deceleration control is performed on the robot 1 so that the first control amount does not fall below the minimum control amount. Consequently, the robot 1 can be stopped at the target location accurately and smoothly.

The present disclosure is useful for a household robot.

What is claimed is:

1. A robot, comprising:
a main body having a spherical-zone shape, the spherical-zone shape defined by a first side and a second side opposed to the first side being removed from a sphere;
a first spherical-crown corresponding to the first side;
a second spherical-crown corresponding to the second side;
a shaft that connects the first spherical-crown and the second spherical-crown;
a display that is mounted in the shaft via an arm, the display configured to display at least part of a face of the robot;
a first drive mechanism that is configured to rotate the first spherical-crown and the second spherical-crown by rotation of the shaft;
a second drive mechanism that is independent of the first drive mechanism and configured to rotate the main body around the shaft as a center;
an angular speed sensor that is configured to detect an angular speed, of the display, around an axis in a horizontal direction perpendicular to a moving direction of the main body;
a memory that stores a correspondence relationship between a reference pitch angle and a minimum control amount, the minimum control amount being used by the second drive mechanism for moving the main body without stopping; and
a control circuit that is configured to, when the robot moves to a predetermined target point by rotating the main body:
detect a maximum value of a pitch angle which changes since an instruction to rotate the main body is received by the second drive mechanism, the pitch angle being a cumulative value of the detected angular speed;
determine an actual minimum control amount corresponding to the detected maximum value of the pitch angle by referring to the correspondence relationship;
when the robot is at a predetermined distance short of the predetermined target point, generate a deceleration control amount for the second drive mechanism that is greater than or equal to the actual minimum control amount, according to a remaining distance to the predetermined target point; and
decelerate a rotation of the main body by controlling the second drive mechanism in accordance with the deceleration control amount.

2. The robot according to claim 1,
wherein the control circuit decelerates the rotation of the main body by decreasing the deceleration control amount by S-curve control.

3. The robot according to claim 2,
wherein, when movement of the robot is started by rotating the main body, the control circuit is further configured to accelerate the rotation of the main body by increasing an acceleration control amount for accelerating the rotation of the main body by trapezoidal control until a rotational speed of the main body is a predetermined speed.

4. The robot according to claim 3,
wherein, after the rotational speed of the main body is the predetermined speed, the control circuit is further configured to maintain the rotational speed of the main body at the predetermined speed until the robot arrives at predetermined distance short of the predetermined target point.

5. The robot according to claim 1, further comprising:
a camera in at least one of the first spherical-crown and the second spherical-crown; and
a microphone in at least one of the first spherical-crown and the second spherical-crown,
wherein the memory stores a reference data image for checking a person and reference voice data for recognizing a voice, and
the control circuit is further configured to, when determining that a predetermined person utters predetermined words based on voice data input from the microphone and the reference voice data and when recognizing the predetermined person based on image data input from the camera and the reference data image, set a location of the predetermined person as the predetermined target point.

6. The robot according to claim 1,
wherein the control circuit generates the deceleration control amount by a calculation expression of:

$$(\text{SIN}(3*\pi/2-\pi/L*d)+1)*(\text{Max}-\text{min})/2+\text{min}, \text{ and}$$

in the calculation expression:
d is a distance in meters from a location of the robot to the predetermined target point;
Max is a control amount in hertz when the control circuit starts to control the second drive mechanism in accordance with the deceleration control amount;
min is the minimum control amount; and
L is the predetermined distance from the predetermined target point.

* * * * *